Dec. 30, 1958     J. J. SENNELLO     2,866,306
HIGH SPEED COVER FEED AND CONTROL ARRANGEMENT
Filed July 24, 1956     15 Sheets-Sheet 1
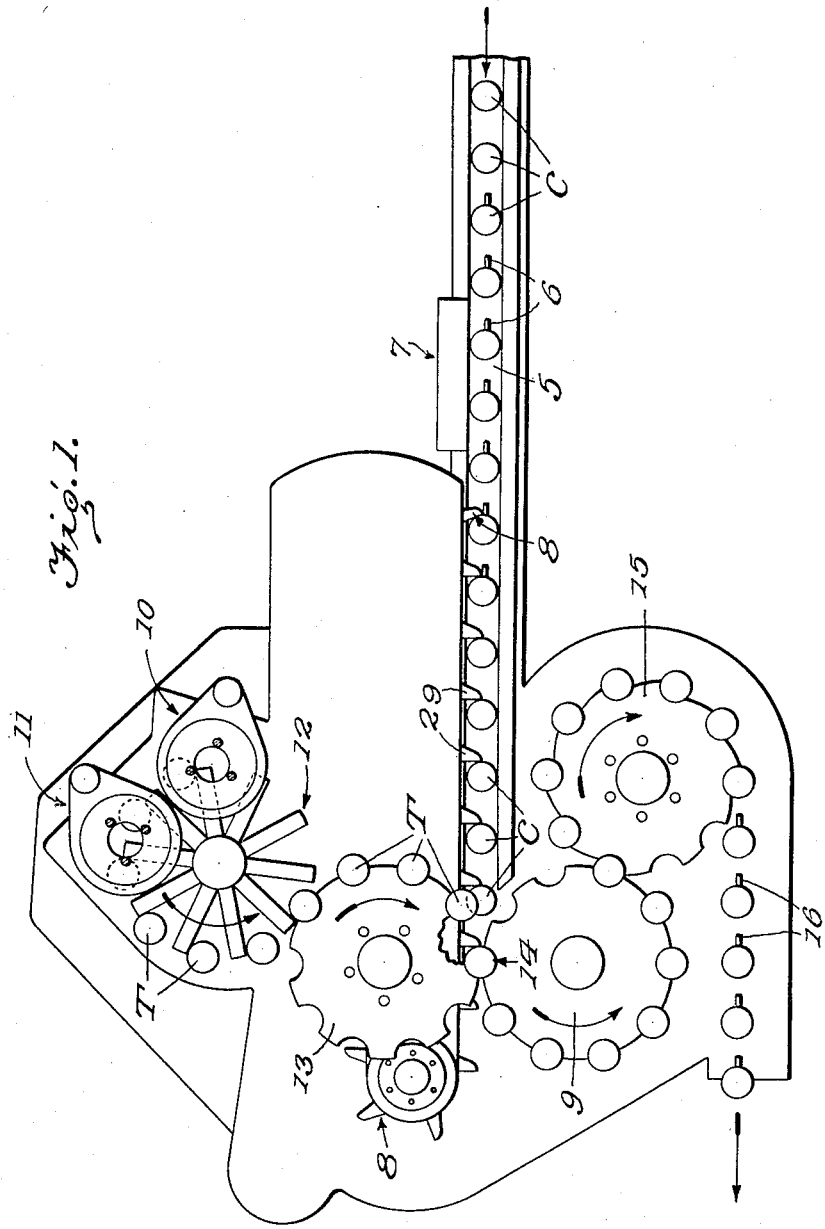
INVENTOR
Joseph J. Sennello
BY
Mason, Porter, Diller & Stewart
ATTORNEYS Dec. 30, 1958   J. J. SENNELLO   2,866,306
HIGH SPEED COVER FEED AND CONTROL ARRANGEMENT
Filed July 24, 1956   15 Sheets-Sheet 2
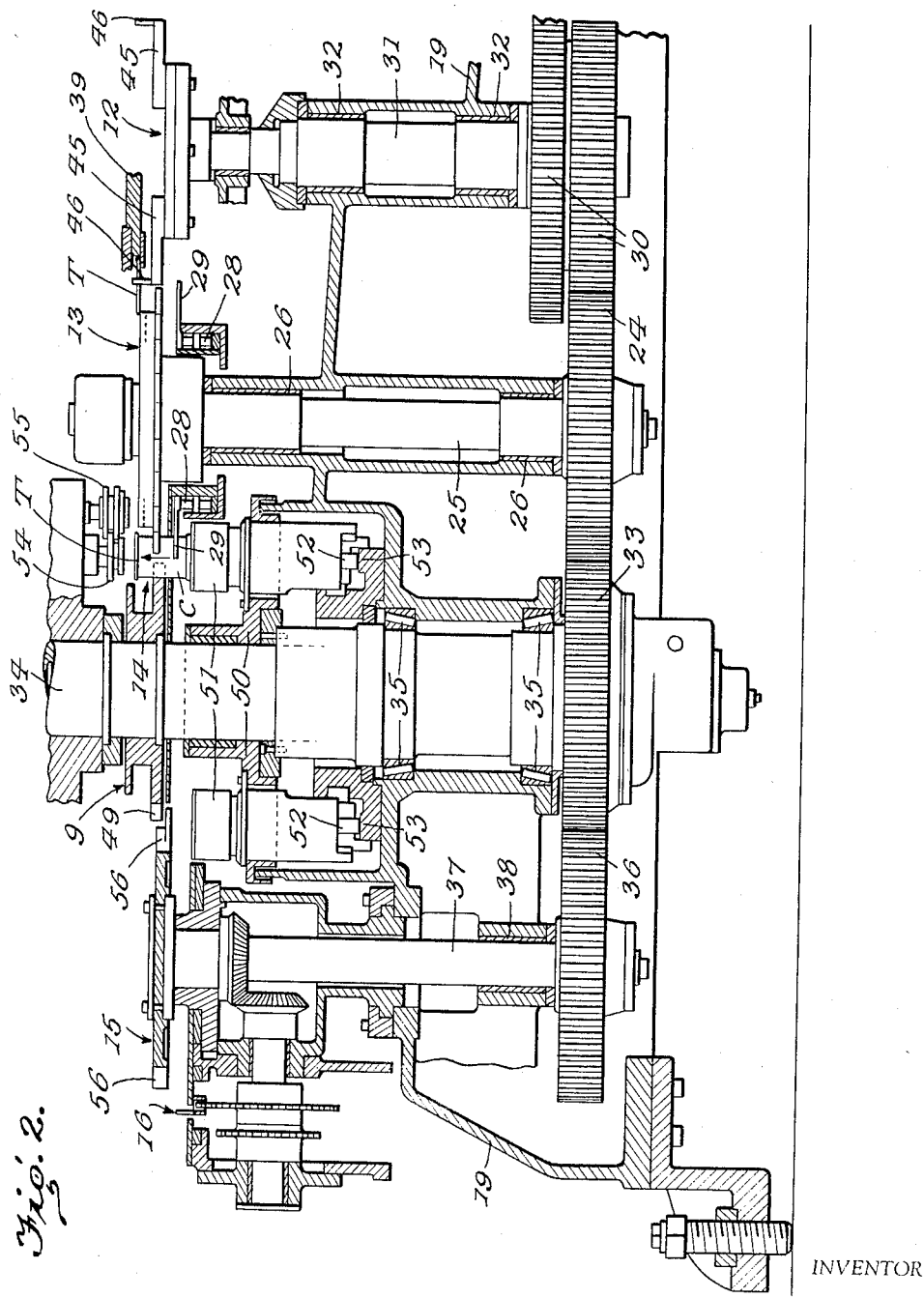
INVENTOR
Joseph J. Sennello
BY
Mason, Porter, Diller & Stewart
ATTORNEYS Dec. 30, 1958 J. J. SENNELLO 2,866,306
HIGH SPEED COVER FEED AND CONTROL ARRANGEMENT
Filed July 24, 1956 15 Sheets-Sheet 3
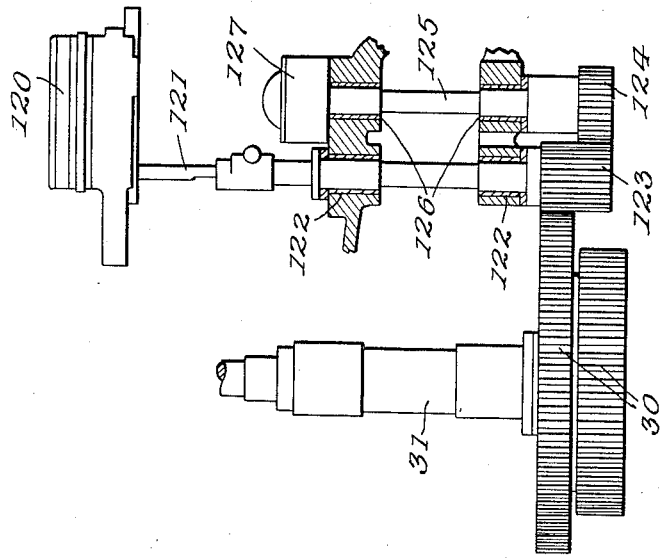
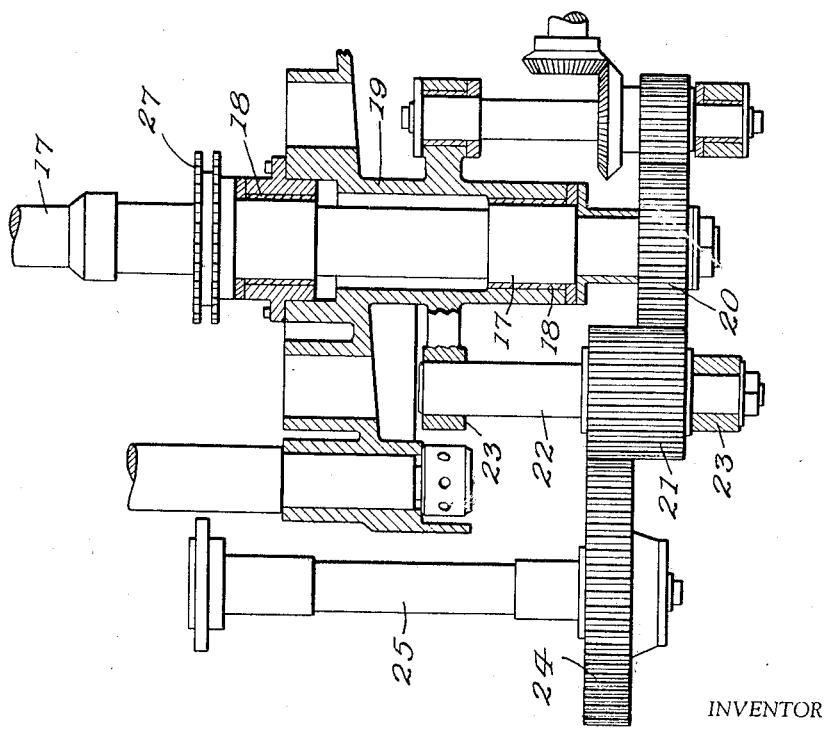
INVENTOR
Joseph J. Sennello
BY
Mason, Porter, Diller & Stewart
ATTORNEYS Dec. 30, 1958  J. J. SENNELLO  2,866,306
HIGH SPEED COVER FEED AND CONTROL ARRANGEMENT
Filed July 24, 1956  15 Sheets-Sheet 4
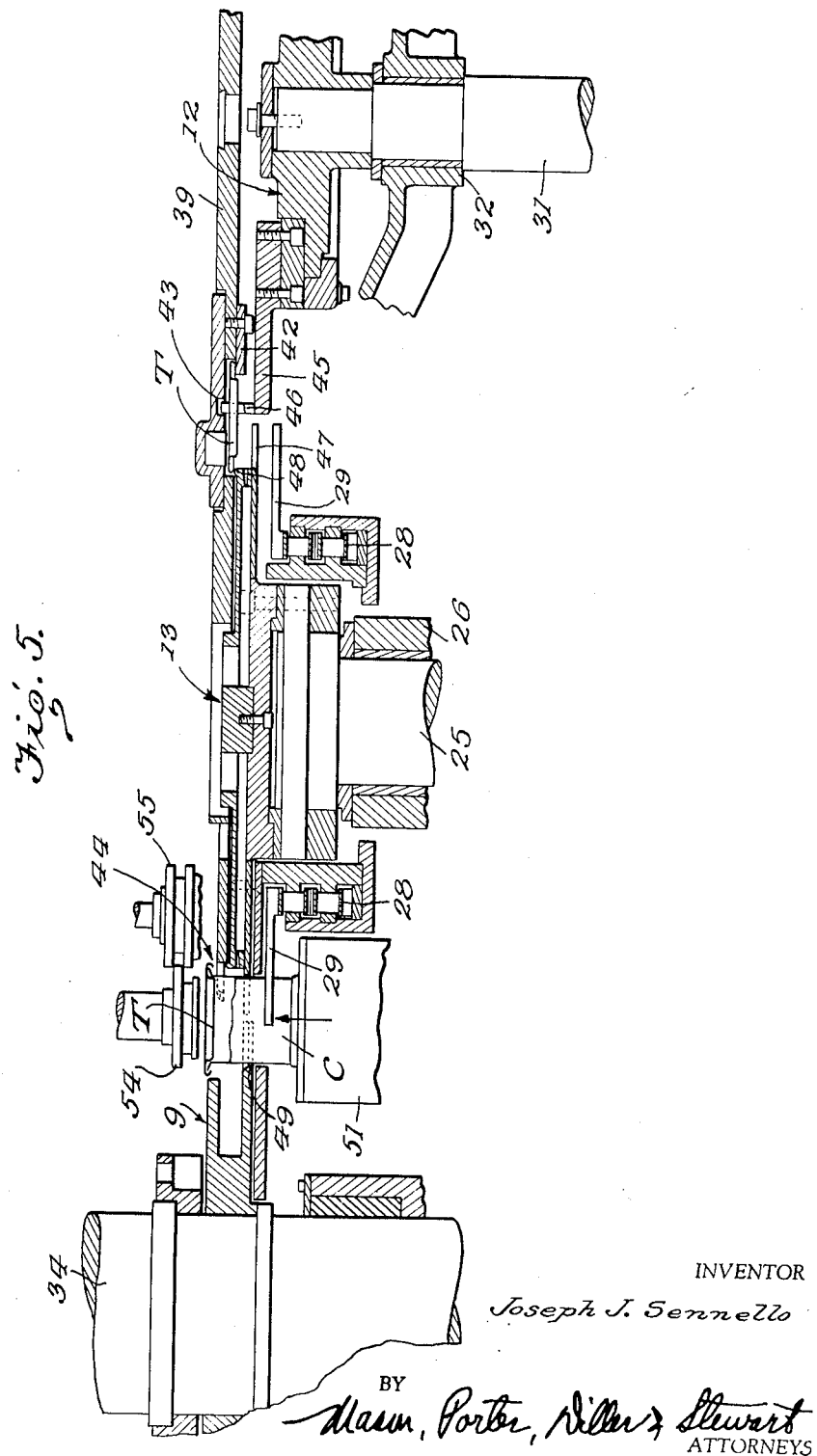
INVENTOR
Joseph J. Sennello
BY
Mason, Porter, Diller & Stewart
ATTORNEYS

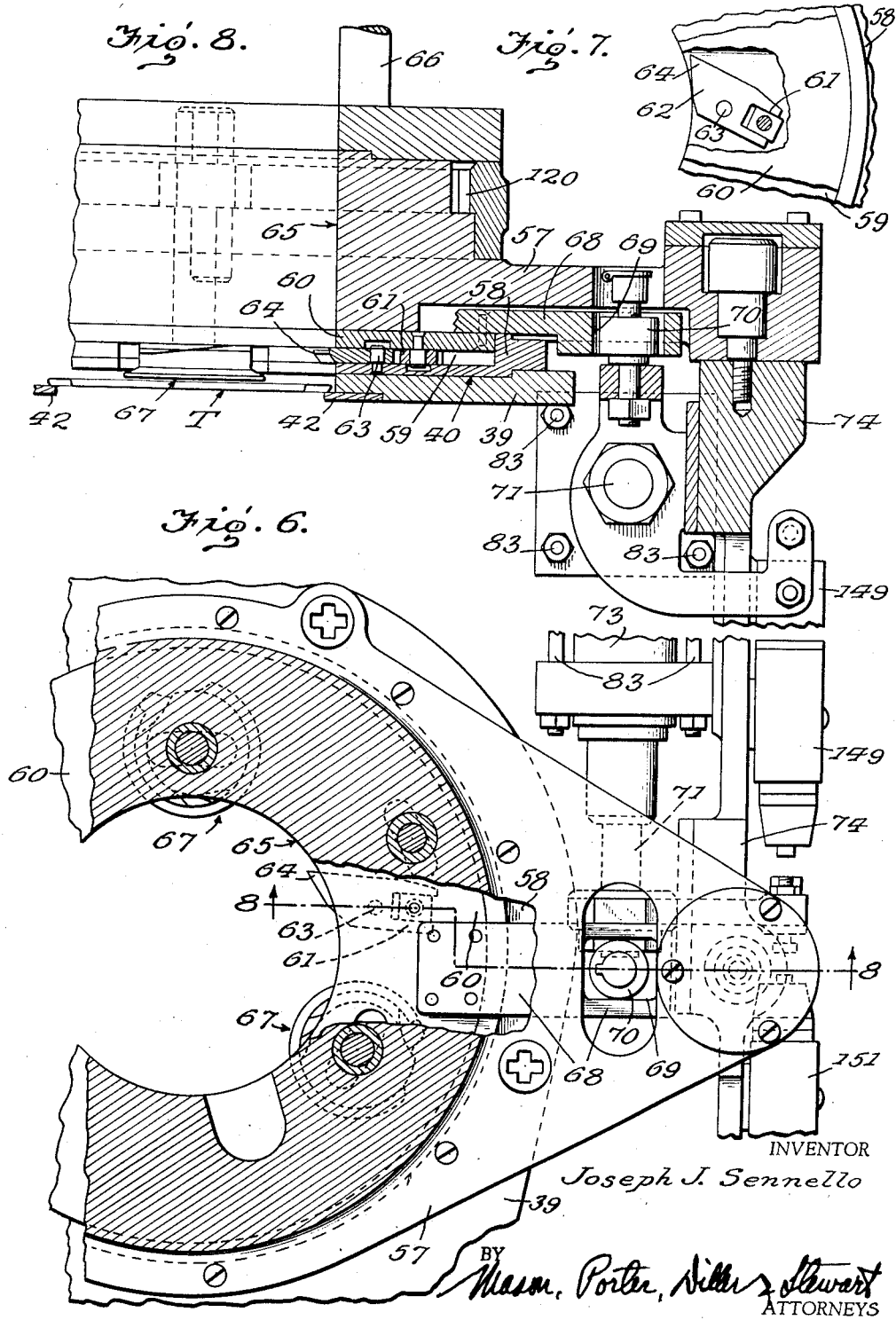

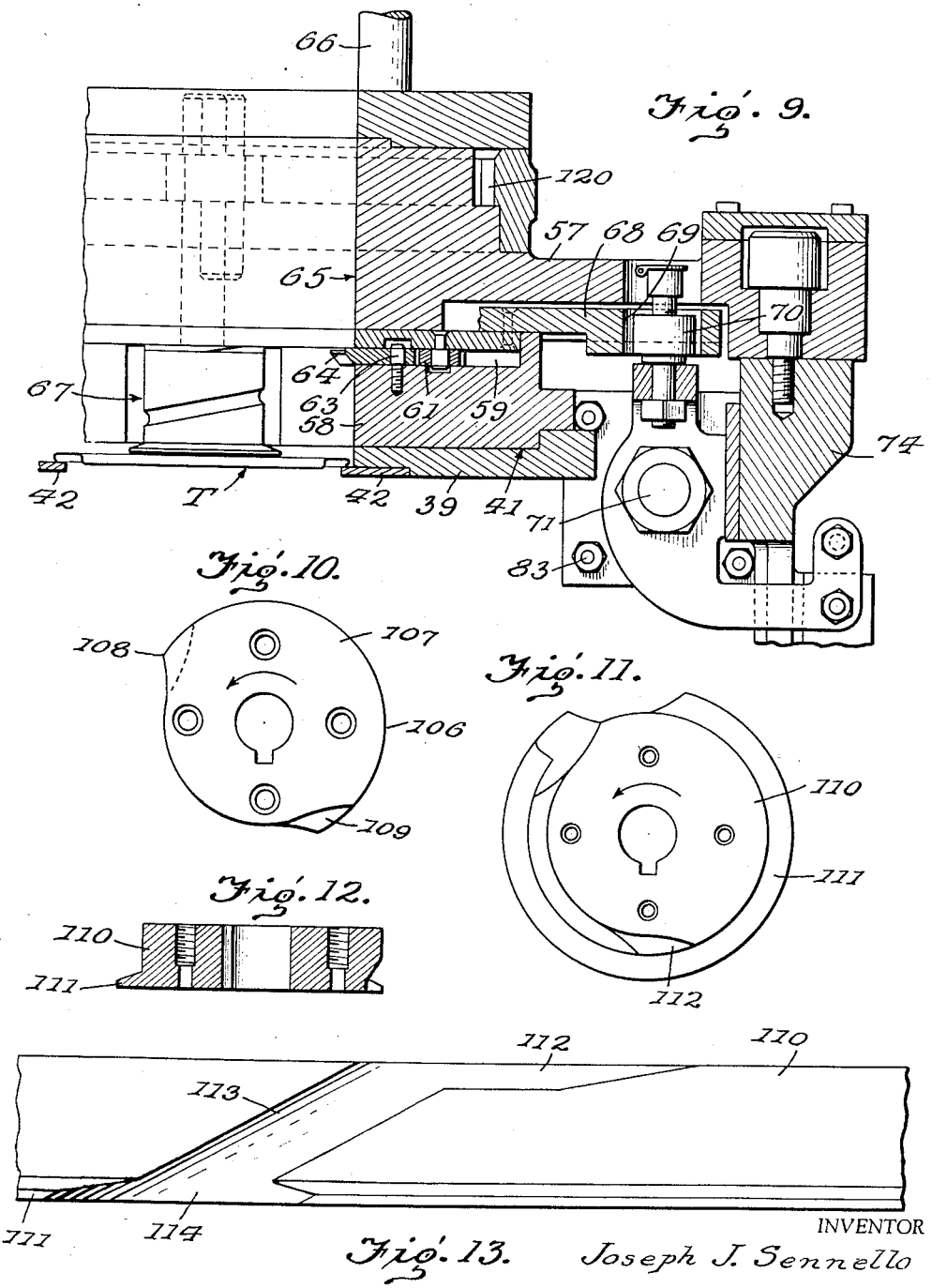

Dec. 30, 1958 J. J. SENNELLO 2,866,306
HIGH SPEED COVER FEED AND CONTROL ARRANGEMENT
Filed July 24, 1956 15 Sheets-Sheet 7

INVENTOR
Joseph J. Sennello
BY
Mason, Porter, Diller & Stewart
ATTORNEYS

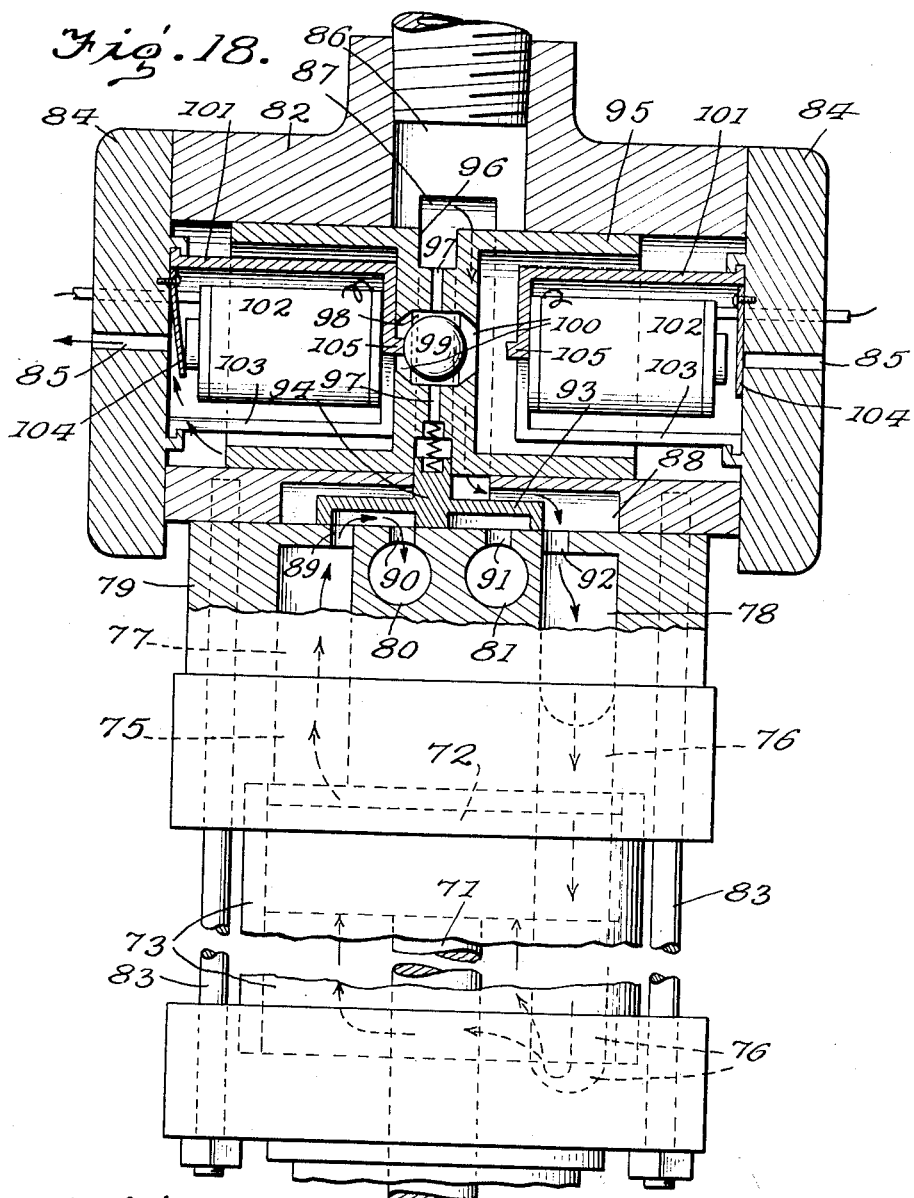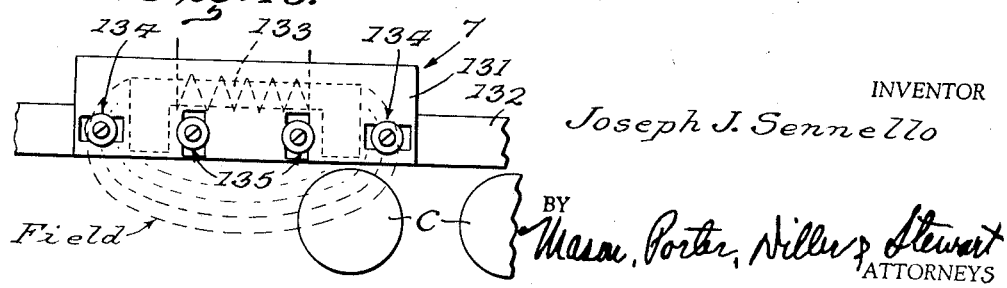

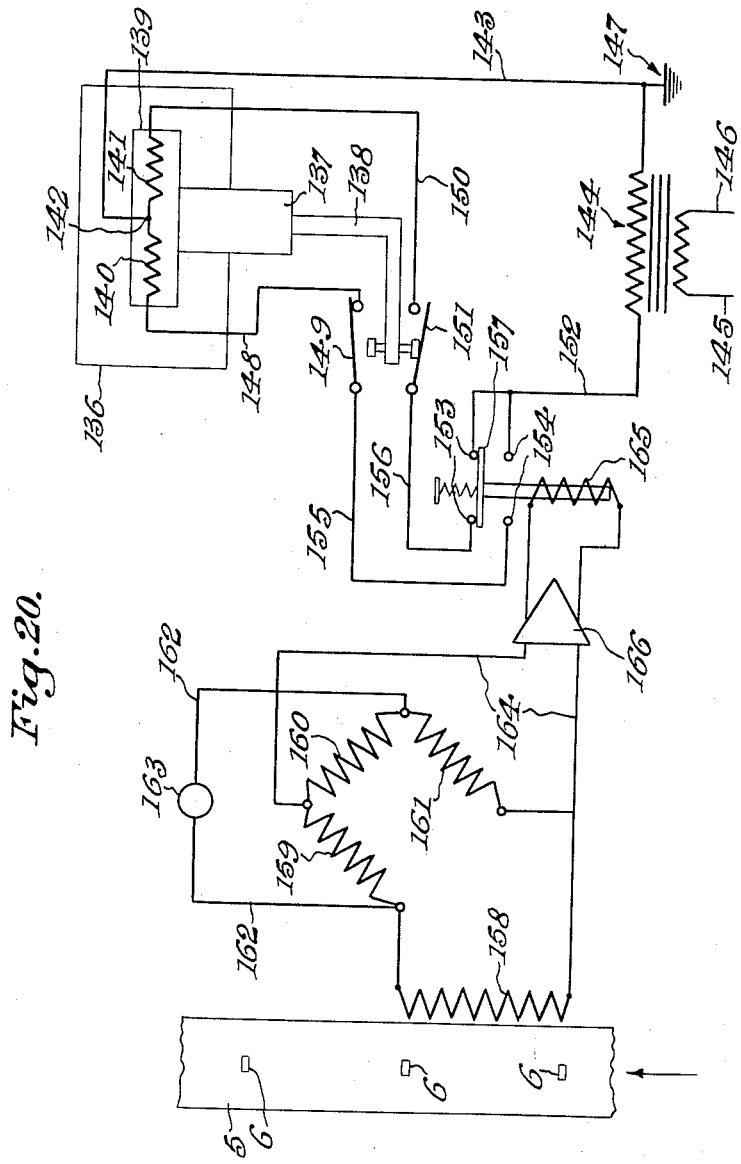

Dec. 30, 1958 J. J. SENNELLO 2,866,306
HIGH SPEED COVER FEED AND CONTROL ARRANGEMENT
Filed July 24, 1956 15 Sheets-Sheet 10

INVENTOR
Joseph J. Sennello

BY
Mason, Porter, Diller & Stewart
ATTORNEYS

Dec. 30, 1958  J. J. SENNELLO  2,866,306
HIGH SPEED COVER FEED AND CONTROL ARRANGEMENT
Filed July 24, 1956  15 Sheets-Sheet 13

INVENTOR
Joseph J. Sennello
BY
Mason, Porter, Diller & Stewart
ATTORNEYS

Dec. 30, 1958  J. J. SENNELLO  2,866,306
HIGH SPEED COVER FEED AND CONTROL ARRANGEMENT
Filed July 24, 1956  15 Sheets-Sheet 15

INVENTOR
Joseph J. Sennello
BY
Mason, Porter, Diller & Stewart
ATTORNEYS

United States Patent Office 2,866,306
Patented Dec. 30, 1958

2,866,306

HIGH SPEED COVER FEED AND CONTROL ARRANGEMENT

Joseph J. Sennello, Chicago, Ill., assignor to Continental Can Company, Inc., New York, N. Y., a corporation of New York Application July 24, 1956, Serial No. 599,860

25 Claims. (Cl. 53—70)

The present invention relates generally to improvements in double seaming or closing machines for assembling can-ends or covers with can bodies or filled open end cans and more specifically to the devices for feeding the can-ends or covers in processional order and equidistantly spaced relationship in time with the feeding of the can bodies or filled unclosed cans. The invention contemplates providing an improved and novel can-end feeding and control arrangement for accurately assembling can-ends with a procession of can bodies traveling at a rapid rate.

It is quite common to provide can-end feeders of the general character stated wherein are employed control devices actuated by the can bodies or filled cans moving toward the double seaming machine. These arrangements usually are controlled by actual can contact and while they serve the desired purpose of feeding the can-ends in processional order when the cans are moving in unbroken sequence, and for braking the continuity of can-end feeding and then resuming the same each time the sequence of can feeding is broken and resumed, they have been found objectionable because the contact of the control devices with the cans has sometimes served to mar lithographic decorations thereon. It is a purpose of the present invention to provide a can-end feeding arrangement and a control therefor entirely eliminating the need for any contacting of the control devices with the passing cans and all objectionable results flowing from such can contacts.

While the improved control devices herein disclosed are adapted for more general use, they are particularly adapted for use in combination with cover feeding means such as are disclosed in U. S. Letters Patent 2,579,976 issued to Justin Simpson on December 25, 1951. In this patent disclosure there are included members normally operable to support a stack of covers and for feeding them one by one off the bottom of the stack, and supplementary supporting devices movable into and out of position for taking over the support of the stack and silencing the feeding of covers. The present invention has for one of its objects combination with such means of electrically controlled, fluid pressure actuated means for shifting the supplementary devices into their stack supporting position each time there is a break in the feeding of cans, and for again moving said devices away from said stack supporting position as proper feeding of cans is resumed so as to permit the cover supporting and feeding members to resume their normal cover supporting and feeding function, there being included novel electrical control devices operable by mere passage of cans through a magnetic field.

An object of the invention is to provide in a can and cover feed arrangement of the character stated, means for feeding the cans in processional order and in equidistantly spaced relation, means for moving covers in like equidistantly spaced relation to be received on the cans at a make up point, two cover feeder units, and means for controlling operation of the feeder units to cause them to deposit covers one at a time and alternately to be received in alternation and in said equidistantly spaced relation upon the cover moving means.

Another object of the invention is to provide an arrangement of the character stated wherein the control means is actuated by the mere presence of the cans being fed toward the closing machine past, and without any physical contact at, a fixed control area.

Another object of the invention is to provide an arrangement of the character stated wherein there are included novel control means actuated by the passing of alternate cans to bring about the feeding of covers from one cover feeder unit and by the passing of the other alternate cans to bring about the feeding of covers from the other cover feeder unit.

Another object of the invention is to provide an arrangement of the character stated wherein the #1 and #2 cover feeder units are spaced along the line of cover feed toward the can procession and wherein there are included in the #2 cover feeder unit means for retarding the actual deposition of each cover delivered thereby so that the #2 feeder unit will properly feed covers in alternation to those fed from the #1 cover feeder and in proper timing to be received upon the alternate cans which controlled the feeding thereof.

Another object of the invention is to provide an arrangement of the character stated wherein the cover feeder units include grooved rotary screws for feeding the covers, the screws in the #2 cover feeder unit each having a holding screw groove portion in which to hold and retard the feeding of each cover in the process of being fed thereby toward its point of deposition.

Another object of the invention is to provide an arrangement of the character stated wherein at least one cover feeder unit is employed and wherein the means for controlling operation of the unit by mere entrance of a can into the fixed control area during the feeding of the cans past the control area includes an inductance bridge circuit having a part subject to influence by the inductance change created by the metal in a passing can to modify a predetermined normal control condition of the bridge circuit.

Another object of the invention is to provide an arrangement of the character stated wherein one arm of the inductance bridge circuit is extended along the line of feed of the cans moving toward the closing machine.

Another object of the invention is to provide an arrangement of the character stated wherein provision is made for varying the effective length of the bridge arm along the can feed line to compensate for changes made in the spacing of the cans along said feed line.

Another object of the invention is to provide an arrangement of the character stated wherein the provision for varying the effective length of the bridge arm is made by inclusion of a variable amplifier in the bridge control circuit.

Another object of the invention is to provide an arrangement of the character stated wherein provision is made for adjusting the position of the bridge arm along and laterally with relation to the can feed line.

Another object of the invention is to provide an arrangement of the character stated wherein the #1 and #2 cover feeder units are spaced over and deliver their covers into position ahead of feeder arms on a rotary star wheel, said wheel being effective to deliver the covers into the pockets of a rotary feed turret in turn presenting them at the make-up point where the cans and covers come together and are assembled and from whence the assembled covers and cans are carried by a rotary closing turret while the covers are being secured on the cans, the filled cans being fed to the make-up point in a straight line by feed means extending in a straight line not only to said make-up point but beyond the same.

A further object of the invention is to provide an arrangement of the character stated wherein the can feed spacing and the turret and star wheel arm spacings correspond one to the other and the control point and the #1 cover feed cover drop point are each placed a like number of spaces from the make-up point, the #2 cover feed cover drop point being spaced two spaces beyond the cover drop point of the #1 cover feed in the direction of movement of the covers toward the make-up point, and there being included means for rotating the cover feeding screws of each of the #1 and #2 feeder units one half turn for each turret pocket or arm space travel, and control means for causing the units to operate alternately in depositing individual covers in advance of the turret arms with the actual delivery of covers by the #2 unit retarded to compensate for said spacing of the units along the line of cover feed and assure that each cover will be placed upon the can which controlled its delivery.

A still further object of the invention is to provide an arrangement of the character stated wherein the control circuit means includes two constantly rotating cams one associated with the #1 cover feed unit control and the other with the #2 cover feed unit control, the cams operating in 180° phase relation to cause the #1 and #2 units to operate alternately with the one unit controlled by passage of alternate, odd numbered cans moving along the feed line and with the other unit controlled by the passage of the remaining alternate, even numbered cans moving along the feed line.

With the above and other objects in view that will hereinafter appear, the nature of the invention will be more clearly understood by reference to the following detailed description, the appended claims and the several views illustrated in the accompanying drawings.

In the drawings:

Figure 1 is a diagrammatic plan view illustrating the cover feed and control arrangement.

Figure 2 is a fragmentary vertical sectional view illustrating the driving connections of the feed turret, the star wheel by which the covers are fed to the feed turret, the closing turret to which the covers are fed by the feed turret and whereon the covers are seam-secured to the cans also fed to the closing turret, and the discharge turret which receives the closed cans from the closing turret and delivers them to a feed-away conveyor.

Figure 3 is a fragmentary vertical sectional view illustrating the vertical drive shaft through which the can feeder chain is driven and which also serves to impart rotation to the several turret structures shown in Figure 2.

Figure 4 is a fragmentary vertical sectional view showing one cover feeder unit in elevation and its ring gear drive and the associated timer and its drive in vertical cross section.

Figure 5 is an enlarged fragmentary vertical sectional view at the make-up point showing a fragment of each of the closing turret and the cover feed turret with the cooperating turret pockets embracing a can and the closing turret pad being lifted to engage the can with the overlying cover for initiating the can and cover assembly and moving the assembly into position for being engaged by the chuck and seaming rolls of the closing mechanisms.

Figure 6 is a fragmentary plan view and part horizontal section illustrating the #1 cover feeder unit, the oscillatable lug projecting and retracting ring being shown in position for placing the stack supporting lugs in the projected, stack supporting position.

Figure 7 is a fragmentary plan view illustrating one of the stack supporting lugs in its fully retracted position.

Figure 8 is a vertical cross section taken on the line 8—8 on Figure 6.

Figure 9 is a view similar to Figure 8, the section being taken through the #2 feeder unit.

Figure 10 is a plan view of one of the top cut-off plates carried by the feeder screws of the #1 and #2 cover feeder units.

Figure 11 is a plan view of one of the #1 feeder screws with the top plate removed therefrom.

Figure 12 is a vertical cross section taken through one of the #1 feeder screws.

Figure 13 is a face development illustrating the cover feed grooving of one of the #1 feeder screws.

Figure 14:
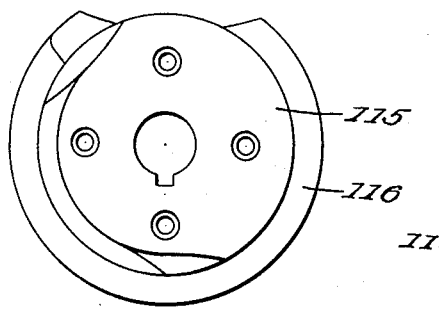

Figure 14 is a plan view of one of the #2 feeder screws with the top plate removed therefrom.

Figure 15:
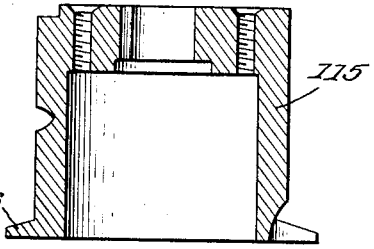

Figure 15 is a vertical cross section taken through one of the #2 feeder screws.

Figure 16:
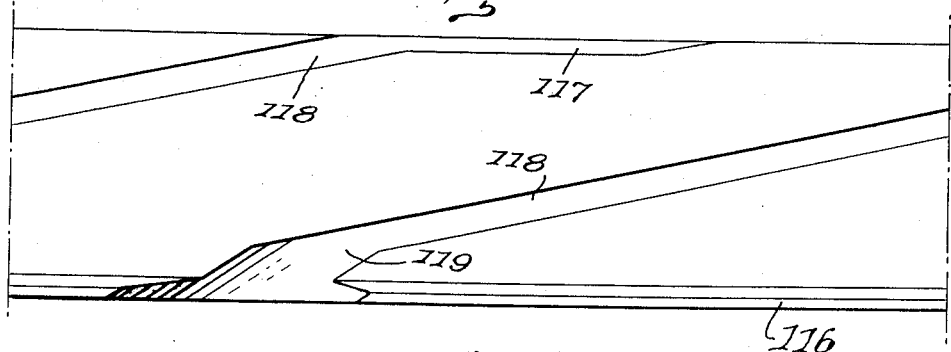

Figure 16 is a face development illustrating the cover feed grooving of one of the #2 feeder screws.

Figure 17:
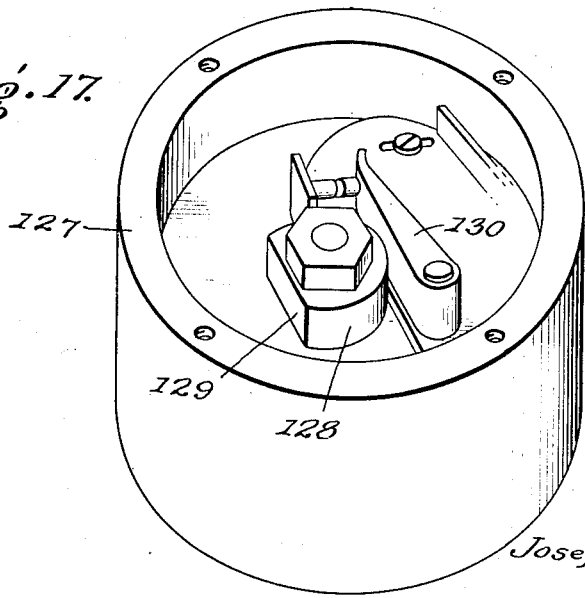

Figure 17 is a perspective view looking down into one of the timer units.

Figure 18 is a longitudinal sectional view illustrating one of the electrically controlled, air actuated units for shifting the stack supporting lug projecting and retracting ring of one of the cover feeder units.

Figure 19 is a somewhat diagrammatic plan view illustrating the longitudinally and laterally adjustable mounting of the bridge arm beside the can feed line.

Figure 21:
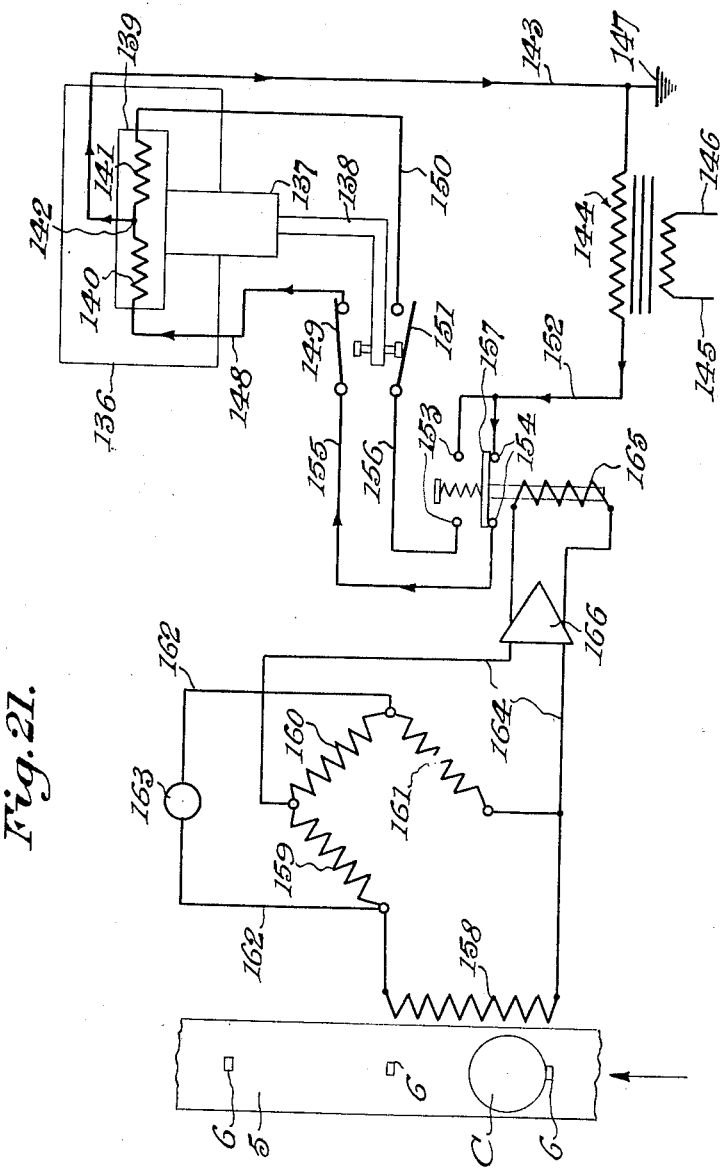
Figure 22:
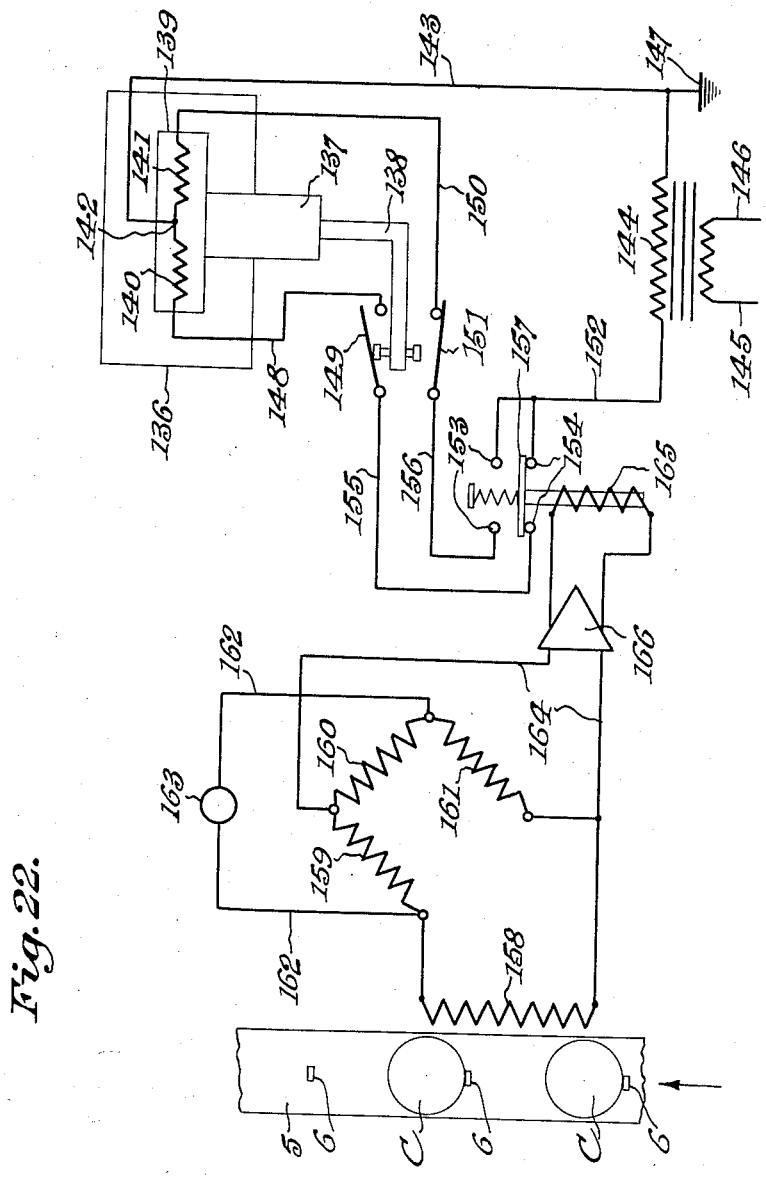

Figures 20, 21 and 22 are schematic diagrams illustrating the control arrangement, including the inductance bridge circuit, three phases of the control in connection with a single cover feed unit being shown.

Figures 23, 24, 25 and 26 are schematic diagrams illustrating the control arrangement, including the inductance bridge circuit, four phases of the control in connection with two cover feed units being shown.

In the example of embodiment of the invention herein disclosed, the cans C are fed in processional order and in equidistantly spaced relation over a straight line feedway generally designated 5, as shown in Figure 1, by feed means generally designated 6, and past the cover feed control head generally designated 7. After the cans pass the position of the control head 7 they are picked up by the straight line feed conveyor generally designated 8 and fed into the receiving pockets of the closing turret designated 9. At the same time can tops or covers T are being deposited alternately by the #1 cover feed unit generally designated 10 and the #2 cover feed unit generally designated 11 into position for being moved along by the sweep arm turret or star wheel generally designated 12 to the pocketed cover feed turret generally designated 13 which deposit them onto the cans at the makup point 14 where the covers T and the underlying cans C come into alignment.

While moving about on the closing turret 9, the cans C have the covers T double seam secured thereon in the usual manner, and the closed cans are then delivered by the closing turret 9 into the pockets of the discharge turret generally designated 15 from whence they are fed away by the take-off conveyor generally designated 16.

A drive column 17 (Figure 3) is uprightly disposed and rotatable in bearing means 18 provided therefor in the base framing 19, being driven by power applying devices (not shown) having drive connection with the upper end thereof. At its lower end the column 17 carries a driver gear 20 which meshes with and drives a long idler gear 21 which is rotatable about a stud shaft 22 supported in the frame bearings 23. The idler gear 21 in turn drives the gear 24 secured on the feed turret shaft 25 (Figure 2) whereon the cover feed turret generally designated 13 is mounted, said shaft 25 being rotatable in frame bearings 26 and carrying the cover feed turret generally designated 13 at the upper end thereof.

Attention is directed to Figures 1, 3 and 5 from which it will be apparent that the column 17 is equipped with a sprocket 27 for driving the endless chain 28 having the laterally projecting can feed arms 29 and comprising the feed means generally designated 8 in Figure 1. The chain 28 passes over an idler (not shown) at the end thereof remote from the sprocket 27, and one flight of the chain passes at one side, and the other flight at the opposite side of the shaft 25 whereon the cover feed turret generally designated 13 is carried.

The gear 24 fixed on the cover feed turret shaft 25 meshes with and drives a gear 30 fixed on the star wheel shaft 31 which carries the star wheel generally designated 12 at the upper end thereof and is rotatable in frame bearing means 32. The gear 24 also meshes with and drives a gear 33 fixed on the closing turret column or shaft 34 whereon the closing turret generally designated 9 is mounted, said shaft being rotatable in frame bearings 35. The gear 33 in turn meshes with and drives the gear 36 on the shaft 37 whereon the discharge turret generally designated 15 is mounted, and the shaft 37 rotates in the frame bearing means 38.

Suitably supported on the machine framing is the cover feed unit supporting and cover guiding plate 39, the latter having recesses 40 and 41 in which to receive the cover feed units, and guide means 42 secured to the undersurface thereof in which to support the covers T as they are moved toward the make-up point 14. The plate 39 extends in part over the star wheel 12 and has arcuate clearances 43 for the cover moving fingers of the star wheel 12. The plate 39 also extends in part over the pocketed cover feed turret 13 which conveys the covers T to the make-up point 14 where the plate 39 has a clearance 44 to permit the cans and complementary covers to come together and move up against the chucks of the conventional closing means.

The star wheel 12 on the shaft 31 carries ten radially extending sweep arms 45, each having at its outer end an upstanding cover feeder finger 46 which engages the covers in the manner clearly illustrated in Figure 5.

The cover feed turret 13 carried by the shaft 25 is equipped with peripheral half pockets 47 and cover seats 48, and the pockets 47 match up with like pockets 48 on the closing turret 9 carried by the shaft 34 in the manner clearly illustrated in Figures 1 and 5 of the drawings.

The closing turret generally designated 9 includes a body portion 50 which carries the can supporting pads 51. These pads are rotatably mounted in the conventional manner and supported on rollers 52 riding on cam track means 53. The cam track means is effective for lifting the cans C to bring about the assembly of the covers T thereon, and engagement of the can and cover assemblies with the seaming or closing devices, and also for lowering the cans after they have been closed. Any satisfactory closing means may be employed and conventional chuck and seaming devices are indicated at 54 and 55.

The discharge turret generally designated 15, and which is carried by the shaft 37, also is equipped with half pockets 56 matching those of the closing turret 9 and which receive the closed cans from the closing turret and present them to the take-off conveyor means generally designated 16.

The invention herein disclosed contemplates the employment of a single cover feed unit in combination with novel actuating and control devices, and it also contemplates the use of two, alternately active cover feed units employed in combination with the novel actuating and control devices. In the example disclosure of the employment of two cover feed units the #1 unit and the #2 unit are generally the same in form except for the employment of different feeder screw sets and a thicker base plate on the #2 unit and detailed description of one such unit will suffice for the other except for the differentiating features.

While this cover feeding means may take various forms, it is preferred that the herein disclosed invention be applied to cover feed means such as is disclosed in the Justin Simpson patent hereinbefore referred to.

Portions of cover feeding means of the type referred to and modified for use in the present invention combination are best shown in Figures 6 through 16 of the drawings from which it will be apparent that the same includes a body 57 and a base portion 58 in which is provided an annular seat 59. Within the seat 59 a lug positioning ring 60 is oscillatably mounted. The ring 60 is fork and pivot block connected as at 61 to the stack supporting lugs 62 which are pivotally mounted at 63 on the base 58. Each lug has a cover stack supporting inner end extremity 64 which is projected into and retracted from the center opening 65 through which the covers fall from the upstanding guides 66. The projectable and retractable lugs cooperate with the continuously rotated screws generally designated 67 in controlling the feeding of covers from the bottom of the stack for assembly on the cans.

During normal feeding of the covers the stack rests upon upper surface portions of the screws, and the screws serve to remove the covers one at a time from the bottom of the stack and drop them into position for being transferred for assembly onto the cans. During normal operation of the cover feeding means, the lugs 64 are retracted in the manner illustrated in Figure 7 so that they will not interfere with the feeding of the covers. However, whenever a break in the continuous feeding of cans occurs, the lugs 64 are projected into the opening 65 so as to take over the support of the stack and prevent feeding of the covers by the continuously rotating screws. It is to be understood that the top or cover supporting surfaces of the lugs 64 are substantially at the same level as the cover stack supporting surfaces of the screws so that when the lugs are projected in the manner illustrated in Figures 6 and 8 they can take over the supporting of the cover stack while permitting continued, ineffectual rotation of the screws 67.

In one adaptation the present invention contemplates the use of a single cover feed unit adapted to deposit a cover to be receivable on each can passing along in processional order on the feed line. In another adaptation two cover feed units are employed and are controlled to drop their covers alternately, or one unit, let us say, for assembly on each alternate even numbered can moving along the feed line, and the other unit for assembly on each alternate odd numbered can moving along said feed line. In either adaptation the oscillatable ring 60 of the unit, or of each unit is provided with a radial arm projection 68 which is longitudinally slotted as at 69 to receive an actuator roller 70 in the manner clearly illustrated in Figures 6 and 8. The roller 70 is carried at the end of a reciprocable piston rod 71 which is equipped with a piston 72 operable within the cylinder 73 which is supported on the mounting plate 74. The plate 74 is best shown in Figures 6 and 9 of the drawings.

It will be apparent by reference to Figure 18 of the drawings that each cylinder 73 is equipped with an air duct 75 opening into one end thereof, and an air duct 76 opening into the other end thereof so that said ducts can operate alternately to admit air into and exhaust air from the cylinder 73 so as to bring about reciprocation of the piston 72 in the cylinder. The cylinder ducts 75 and 76 communicate with duct extensions 77 and 78 respectively formed in a valve block 79, and said block also is equipped with exhaust ports 80 and 81, one thereof being associated with each of the duct sets 75, 77 and 76, 78. The control unit shown in detail in Figure 18 also includes a control cylinder 82, and this cylinder, the block 79 and the cylinder 73 are held in assembly as shown in Figure 18 by bolts 83.

The cylinder 82 is closed at its ends by removable caps 84 each having a central bleed port 85 therein, the purpose of which will become apparent as this description progresses. The cylinder 82 also has a centrally disposed air inlet port 86 which comunicates through an annular chamber enlargement 87 with a valve chamber 88 extending along the face of the cylinder opposed to the block 79. Equidistantly spaced ports 89, 90, 91, and 92 open through the face of the block 79 which opposes the valve chamber 88, the ports 89 and 90 communicating with the ducts 77 and 80 respectively, and the ports 91 and 92 communicating with the ducts 81 and 78 respectively in the manner clearly illustrated in Figure 18. An E-valve 93 is slidably mounted in the valve chamber 88 and is connected as at 94 to move with the free piston 95 reciprocable in the cylinder 82 for properly controlling the ports.

In the position of the valve illustrated in Figure 18, the ports 89 and 90 are connected to allow air to exhaust from the ducts 75, 77 into the exhaust duct 80, and pressure fluid is directed through the port 92 and duct 78, 76 for driving the piston 72 upwardly as viewed in Figure 18. It will be apparent that when the valve 93 is shifted to the right the direction of flow of pressure fluid will be reversed so as to drive the piston 72 downwardly.

The free piston 95 reciprocable in the cylinder 82 is cup-shaped at its opposite ends, and its central wall has an annular air groove 96 therein which forms a part of the connection 94 between the piston and the reciprocable valve 93. The central wall of the free piston also is equipped with radial ports 97 communicating between the groove 96 and a central chamber 98 in which a free ball valve 99 is mounted for alternate seating engagement with end seats 100 opening into the end cups of the piston in the manner clearly illustrated in Figure 18.

Each cylinder cap 84 carries a cup-like shell 101 receivable in spaced relation in the respective cupped piston end, and each shell is equipped with an electromagnet 102 and a wall opening 103 permitting ingress of air into the interior of the shell. It will be noted that a reed valve 104 cooperates with each of the bleed ports 85 provided in the caps 84, and it is to be understood that when the coil of one of the magnets 102 is energized the effect will be to retract the respective reed 104 from its position in closing relation over the respective port 85 in the manner illustrated at the left in Figure 18.

With the parts in the position illustrated in Figure 18, it is to be understood that the piston 72 is about to complete its movement of retraction and that immediately upon completion of this retraction the electromagnet at the left will be de-energized to permit the reed shown in the attracted, open position at the left of the figure to seat and close the port 85. It is to be noted that at each travel limit of the piston 95 the respective central shell projection 105 will engage with and unseat the valve ball 99 in the manner illustrated at the left in Figure 18. This will permit an equalization of pressure at opposite ends of the piston 95. Assuming the piston 95 to be at rest at either of its travel limits, pressure at opposite ends thereof will be equalized, and an energizing of the magnet 102 at the end from which the last movement occurred will result in a displacement of the respective reed 104 and an escapement of air through the port 85. This reduction of pressure at this respective end of the piston 95 will cause the pressure at the opposite end of the piston to be dominant and bring about a shifting of the piston 95 toward the end cap 84 through which the exhausting of air occurred. In the particular arrangement disclosed herein, and the detailed arrangement in Figure 18 it is to be understood that the energizing of the magnet 102 at the left will bring about a retraction of the piston 72 whereas an energizing of the magnet 102 at the right will bring about a projection of said piston. Projection of said piston brings about a retraction of the supplementary supporting members 64 as shown in Figure 7, and retraction of said piston serves to project said members 64 as shown in Figure 6.

It has been stated previously that in the adaptation of the invention wherein #1 and #2 cover units are employed in combination with the novel electrical control devices, said units are the same except for the feed screw sets and the thickening of the base plate on the #2 unit to compensate for the greater length of the #2 unit feed screws. These latter screws are longer because they each include a 360° holding or feed retarding groove portion additional to the other feed grooving or recessing. The #1 unit is illustrated in Figures 6 and 8, and the #2 unit in Figure 9. The top, support surface presenting and cut-off plates are identical on all screws of both sets, and one thereof is shown in detail plan view in Figure 10. One of the #1 unit screws is shown in detail in plan, vertical cross section and face development in Figures 11, 12 and 13 respectively, and one of the #2 unit screws is shown in detail in plan, vertical cross section and face development in Figures 14, 15 and 16 respectively.

Each cut-off plate 106 of the cover feed screws includes the upper or cover stack supporting surface 107, the cut-off point 108 and the lowering or drop portion 109. Each of the feeder screws generally designated 67 of the #1 unit includes the top plate 106 and the body 110 having the lower end flange 111, said body having lead recessing or grooving 112 into which the portion 109 of the top plate merges, and a quick pitch feeder groove portion 113 merging into an enlargement 114 as it passes through the body flange. Each of the feeder screws generally designated 67 of the #2 unit similarly includes the top plate 106 and a body 115 having a lower flange 116, said body having the lead recessing or grooving 117, a 360° holding or feed retarding groove portion 118 and a quick pitch delivery portion 119 extending through the flange.

In each cover feed unit the ring gear 120 which drives the feeder screws in the manner disclosed in the Simpson patent previously referred to is gear coupled to the vertical drive shaft 121 rotatable in the bearings 122 and having a gear 123 thereon meshing with and driven by the gear 30 on the star wheel shaft 31. See Figures 2 and 4. Each of the individual feed driving gears 123 meshes with and drives a gear 124 secured on a timer shaft 125 rotatable in bearings 126 and extending upwardly into a housing 127. These timing devices are best illustrated in Figures 4 and 17, and it is to be understood that they are required only when two off the cover feed units are employed in combination. Each shaft 125 carries a rotary control cam 128 at its upper end within the respective housing 127, said cam having a flat face or recess 129 and being disposed in the same horizontal plane with a spring pressed switch lever 130. It is to be understood that each time the flat face or recess 129 on the cam comes opposite the switch lever the latter will be cleared and permitted to move over into position for closing the control switch. Under some conditions the cam control means may not be necessary when a single cover feed unit is being used in combination with the novel control devices disclosed herein, while other conditions may require its use such as when the effective field width cannot be made exactly equal to the can spacing.

The driving connections are such that each feeder screw generally designated 67 makes one half turn for each space travel of a turret pocket 47 or 50, or of the cover feed arms 45. In this example disclosure it will be noted by reference to Figure 1 that the make-up point 14 is placed ten spaces beyond the start of the control area at the control head 7 along the feed line of the cans C. Similarly, the cover dropping point under the #1 cover feed unit shown in Figure 1 is a like number of spaces of cover feed travel ahead of said make-up point, whereas the cover dropping point under the #2 cover feed unit is two spaces closer to the make-up point. With the #1 and #2 cover stacks thus spaced two turret pocket or feeder arm spaces apart there will always be a feeder arm space between the stacks when two feeder arms 45 are in cover receiving position beneath the two cover stacks. The receiving ends of the screws of the two sets are timed 180° out of phase, but the discharge or lower ends of both sets of screws release the covers in phase, or in other words, at the same time. It is to be understood that each screw set will drop a cover upon completion of each full rotation thereof, and since each screw makes only a half turn for the passing of each feeder arm 45 it follows that during normal processional order feeding of cans C the #1 unit screws will deposit covers to be received by alternate, odd arms and pockets whereas the #2 unit screws will deposit covers to be received by alternate, even arms and pockets. It will be apparent that due to the addition of the 360° holding groove portion 118 on each of the #2 unit screws said screws store or hold a cover thereon for 360° of their rotation, thereby depositing the cover for engagement by the star wheel arm 45 immediately following the arm before which the preceding cover was placed by the screws of the #1 unit, despite the fact that the #2 unit is placed two spaces beyond the #1 unit. It is repeated that this cover feed sequence description is based upon the assumption that the cans C are being fed along the feedway 5 and through the control area 7 in normal, unbroken procession.

An outstanding feature of the invention is the provision of novel control means for bringing about actuation of a cover feed means for depositing a cover in position to be received on a given can by mere passage of that particular can through a magnetic field, without any physical contact of the can with any part. This control involves employment of an inductance bridge circuit with one branch or arm of the bridge placed along the can feed line and influenced by the passing of cans.

It is well known that in a suitably energized bridge of the character stated it is possible to provide a predetermined condition of balance, or an unbalanced condition of branches or arms of the bridge, and that by influencing a selected coil or arm of the bridge the condition of balance or unbalance can be upset in a manner causing current flow effective to actuate a relay. According to the present invention, the metal in each can passing through the field of the control arm or inductance extending along the cam feed line brings about the predetermined control condition of the bridge circuit, either balance or unbalance, effective to cause a sensitive relay to act to close the cover feed circuit in a single cover feed unit arrangement, or, in a two unit arrangement, to close the cover feed shift circuit to be fully conditioned for cover feeding purposes by the switch closing function of the rotary timing cam means, all as described in detail hereinafter.

In either arrangement the control arm or inductance of the bridge is extended along the can feed line 5 in the control head 7 as illustrated in Figures 1 and 19. The control head may take the form of an elongated casing 131 supported to one side of and parallel the can feed line on a rail 132. Within the casing the bridge arm is coiled about the core 133 as shown in Figure 19, and the casing is longitudinally-adjustably supported as at 134 so that the bridge arm can be adjusted along the can feed line to vary the starting point of the control area spanned by said arm, and said casing also is laterally-adjustably supported at 135 to permit variation in the spacing to the side of said feed line.

The combination of the improved control devices with a single cover feed unit and actuating means will first be described, and in this connection attention is directed to Figures 20, 21 and 22. In these figures the single cover feed unit is diagrammatically indicated at 136, the associated actuater cylinder at 137, its actuating rod at 138, the valve control cylinder at 139, and the respective feed-on and feed-off control solenoid coils in said last named cylinder at 140 and 141 respectively. The coils 140 and 141 are connected at their proximate ends at 142, and said connection 142 is connected by a conductor 143 with the step-down transformer generally designated 144 and which is connected with the power in-put lines 145 and 146 in the manner indicated. A ground connection may be provided at 147 if desired. It is preferred that the step-down transformer shall function to reduce the service current to eight volts in the control system now being described. At its remote end the coil 140 is connected by a conductor 148 to one contact of the air shut-off switch 149, and at its remote end the coil 141 is connected by a conductor 150 with one contact of the air cut off switch 151. The power input conductor 152 connects with one each of upper and lower pairs of spaced relay contacts 153 and 154. The switch 149 is connected by the conductor 155 with the other of the lower pair of relay contacts 154, and the switch 151 is connected by the conductor 156 with the other of the upper pair of relay contacts 153.

The spring biased relay 157 is operable to close a circuit across the contacts 153 when in raised position and to similarly close a circuit across the contacts 154 when in lowered position.

As before stated, control of the cover means by mere passage of cans is made possible by employment of an inductance bridge the four branches or arms of the bridge being indicated at 158, 159, 160, 161, the arm 158 being placed along the can feed line 5 as described hereinabove. The bridge is excited from a source of alternating current, preferably at four hundred cycles in order to assure high speed response. An example illustration is by connection 162 with a tube oscillator 163. The bridge is connected at 164 with the relay coil 165, and an adjustable amplifier 166 may be employed. This adjustment may be utilized to make the circuit more or less sensitive, and to lengthen or shorten the control area or the bridge control arm field. An adjustable relay also may be utilized to make its action more or less sensitive.

In the manner well known in the art the bridge circuit can be adjusted to the predetermined control condition so that a metal can passing through the field of the bridge arm 158 and its core 133 will bring about the predetermined balance or unbalance of the bridge circuit effective to bring about an actuation of the relay and attainment of the desired circuit control.

Figure 20 illustrates the condition when no cans are passing along the feed line, the relay switch being in the "up" position bridging the contacts 153, the air shut-off switch 151 having been opened during operation of the air cylinder 137 under control of the solenoid 141 to shut off the cover feed, or in other words project the stack supporting lugs 62. The cover feed will remain shut off until a can enters the electro-magnetic field at the control arm 158 of the bridge circuit.

It should be mentioned at this time, as it is applicable to both single or dual cover feed control, that when the cylinder air valve is operated in one direction or the other by solenoid control it remains in the control position to which it has been shifted until it is moved in the opposite direction by action of the opposing solenoid. At the conclusion of each extreme movement of a cylinder piston rod, the close switch which controlled the operation of the cylinder is opened by the rod movement and shuts off the air supply to the cylinder.

When a can enters the field of the induction bridge, as shown in Figure 21, the relay is operated to close the circuit across the contacts 154 whereupon current flows to the solenoid 140 for actuating the air cylinder to bring about a retraction of the supporting lugs 62 as shown in Figure 7, thereby rendering the continuously rotated feeder screws 67 effective and putting the cover feed into operation. It should be understood, however, that when the relay switch is operated to bridge the contacts 154 the position of the air cylinder rod 138 shown in Figure 21 is only momentary, because as soon as the circuit is closed by the relay to operate the solenoid 140, the rod 138 is immediately moved to open the switch 149 as shown in Figure 22, which breaks the circuit to the solenoid 140 and thereby shuts off the air to the air cylinder. At the same time the switch 151 closes but does not complete the circuit to the solenoid 141, because the relay switch does not provide current to the line 156, 150. Thus, it will be seen that the position of the air cylinder rod 138 shown in Figure 21 and the closed position of the relay switch is a very transitory one.

As long as a can lies within the field of the inductance bridge arm 158, the positions of the relay switch 157, the switches 149 and 151 and the switch actuating arm carried by the piston rod 138 remain as shown in Figure 22; but when a can followed by an unoccupied can space moves out of said field, the relay switch will be released and moved to the position shown in Figure 20. In so moving, the relay switch 157 closes the circuit through the lines 156, 150, 152 the solenoid coil 141 which instantly actuates the air cylinder for cutting off the cover feed and simultaneously opening the switch 151 and closing the switch 149, thereby returning them to the positions shown in Figure 20. From the foregoing it will be evident that the field of inductance through which the cans pass must be long enough to enable a can to enter the field before the preceding can leaves the field so that the air cylinder rod 138 and the air cut-off switches 151 and 149 will remain in the positions shown in Figure 21, otherwise there would be a continual operation of the air cylinder between the cover feeding and non-feeding positions.

Reference will now be made to Figures 23 through 26 in describing the control circuits for the combination arrangement including the #1 and #2 cover feed units. In this arrangement the bridge circuit including the relay coil remains the same as described and shown in connection with Figures 20 to 22, as do the can feedway and feeding means, and these parts will not be described again in detail but will be designated with the same reference characters applied in Figures 20 to 22 with an exponent $a$ added to each thereof. The #1 and #2 cover feed units, the diagrammatically illustrated parts thereof and the air cut-off switches are designated with the same reference characters applied in Figures 20 to 22 with exponents $a$ and $b$ added to the respective units, and these will not be described in detail. The connecting power lines, the modified relay switch and the rotary cams forming a part of the circuit controls will be given specific designations applying to the specific illustrations of Figures 23 to 26.

The proximate end connection $142^a$ of the coils $140^a$ and $141^a$ of the #1 cover feed unit $136^a$ and the like connection $142^b$ of the coils $140^b$ and $141^b$ of the #2 cover feed unit $136^b$ are connected by a conductor 167 with the transformer 168. In this arrangement the relay switch is equipped with double bars 169 and 170, the former 169 being disposed to bridge the upper contacts 171 when lifted and the contacts 172 when lowered, and the latter 170 being disposed to bridge the upper contacts 173 when lifted and the contacts 174 when lowered. At its remote end the coil $140^a$ of the #1 cover feed unit $136^a$ is connected by a conductor 175 to one contact of the air cut-off switch $149^a$ and the remote end of the coil $141^a$ of said unit is connected by a conductor 176 to one contact of the air cut-off switch $151^a$. The other contacts of the switches $149^a$ and $151^a$ are connected by the conductors 177 and 178 respectively with lower and upper contacts 174 and 173 respectively at one side of the relay switch, the other relay switch contacts 173 and 174 being connected at 179 with the transformer 168 through the switch 180 controlled by the rotary cam 181. At its remote end the coil $140^b$ of the #2 cover feed unit $136^b$ is connected by a conductor 182 to one contact of the air cut-off switch $149^b$ and the remote end of the coil $141^b$ of said unit is connected by a conductor 183 to one contact of the air cut-off switch $151^b$. The other contacts of the switches $149^b$ and $151^b$ are connected by the conductors 184 and 185 respectively with lower and upper contacts 172 and 171 respectively at one side of the relay switch, the other relay switch contacts 171 and 172 being connected at 186 with the transformer 168 through the switch 187 controlled by the rotary cam 188.

Figure 23:
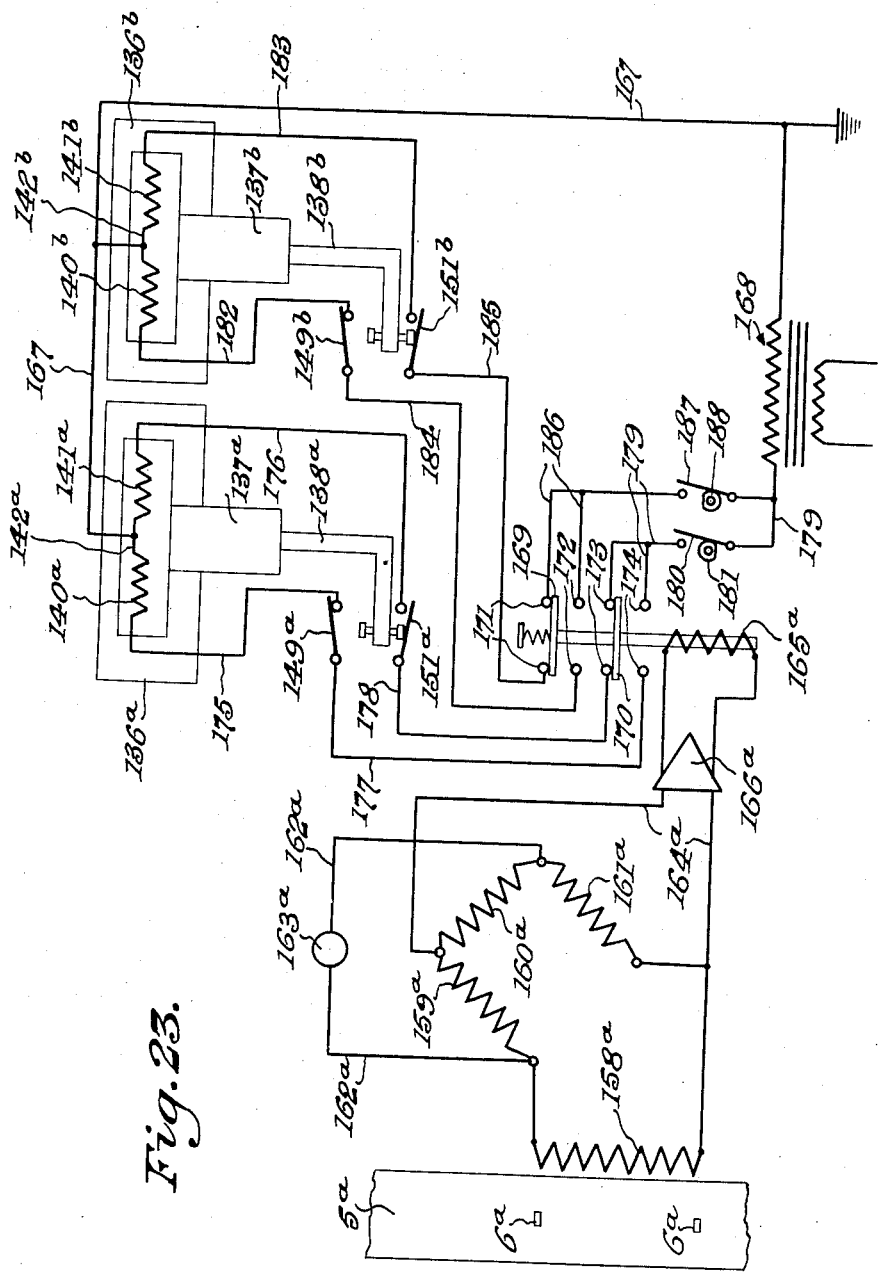

Figure 23 shows the position of the control switches when no cans are within the inductance field of the bridge, during which time the #1 and #2 cover feeds are in the "off" or non-feeding condition.

Figure 24:
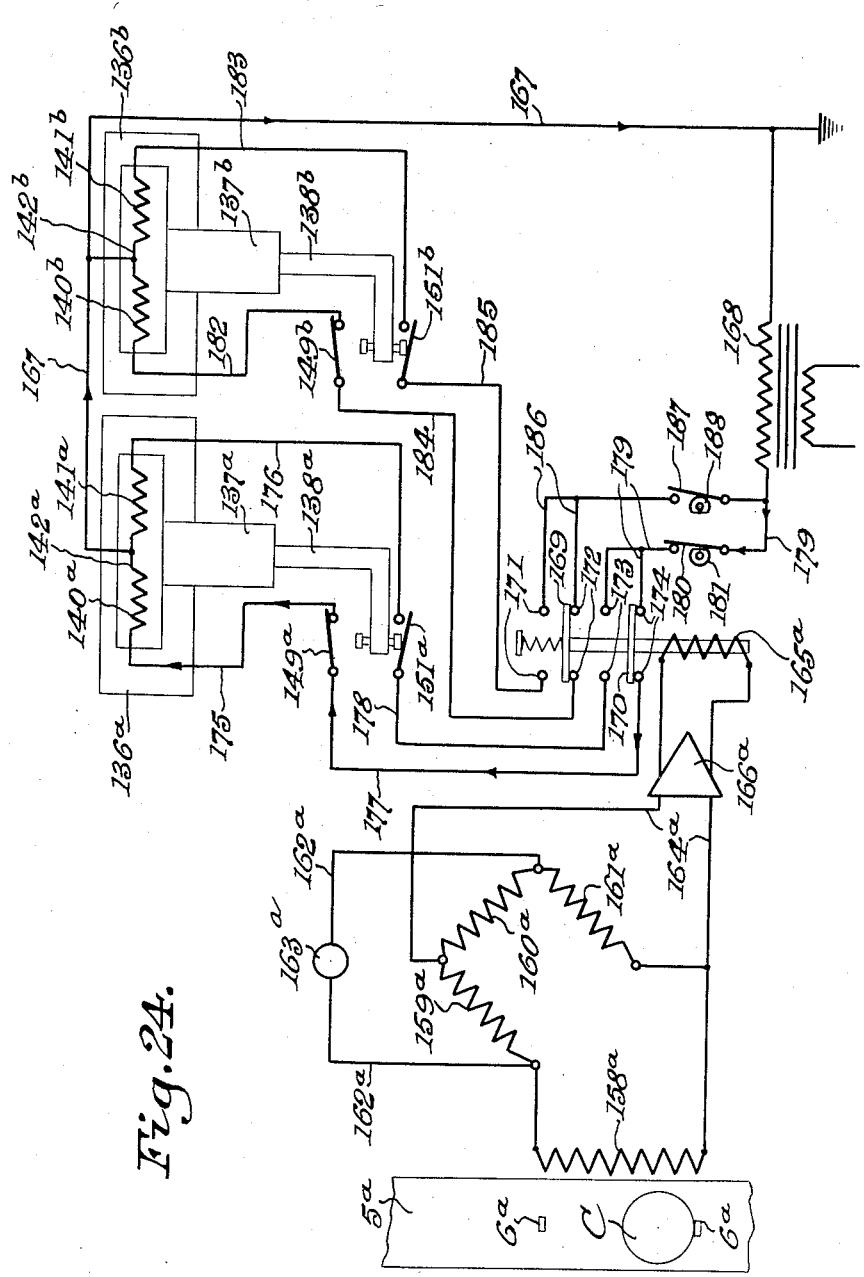
Figure 25:
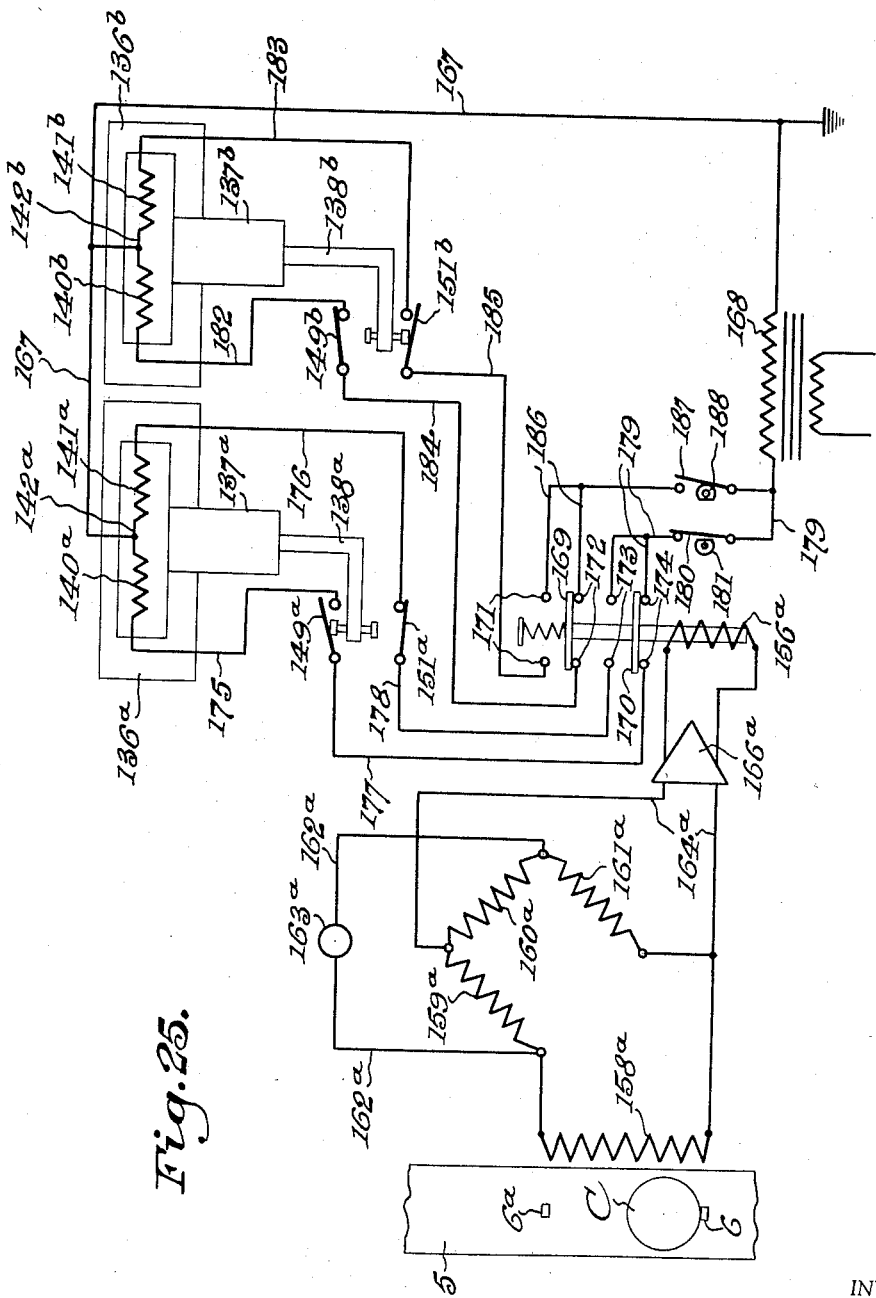

Figure 24 illustrates the first reaction of the circuit to the first can entering the field of the bridge, which generally corresponds with that previously described in connection with the single cover feed. When the can C enters the magnetic field the two switches 170 and 169 operated by the relay are closed to provide communication to the "feed on" solenoids $140^a$ and $140^b$ of both cover feed units $136^a$ and $136^b$. However, only timing cam switch 180 is closed, and therefore, only the circuit to the "feed on" solenoid $140^a$ of the #1 unit $136^a$ will be energized. Upon being energized the solenoid $140^a$ operates its related valve to bring about movement of the air cylinder piston rod $138^a$ from the position shown in Figure 24 to the position shown in Figure 25, thereby to bring about the feeding of a cover. The circuit for the corresponding solenoid of the #2 stack $136^b$ is not energized, even though the switch $149^b$ is closed because the timing cam 188 has not permitted a closing of the switch 187.

Figure 26:
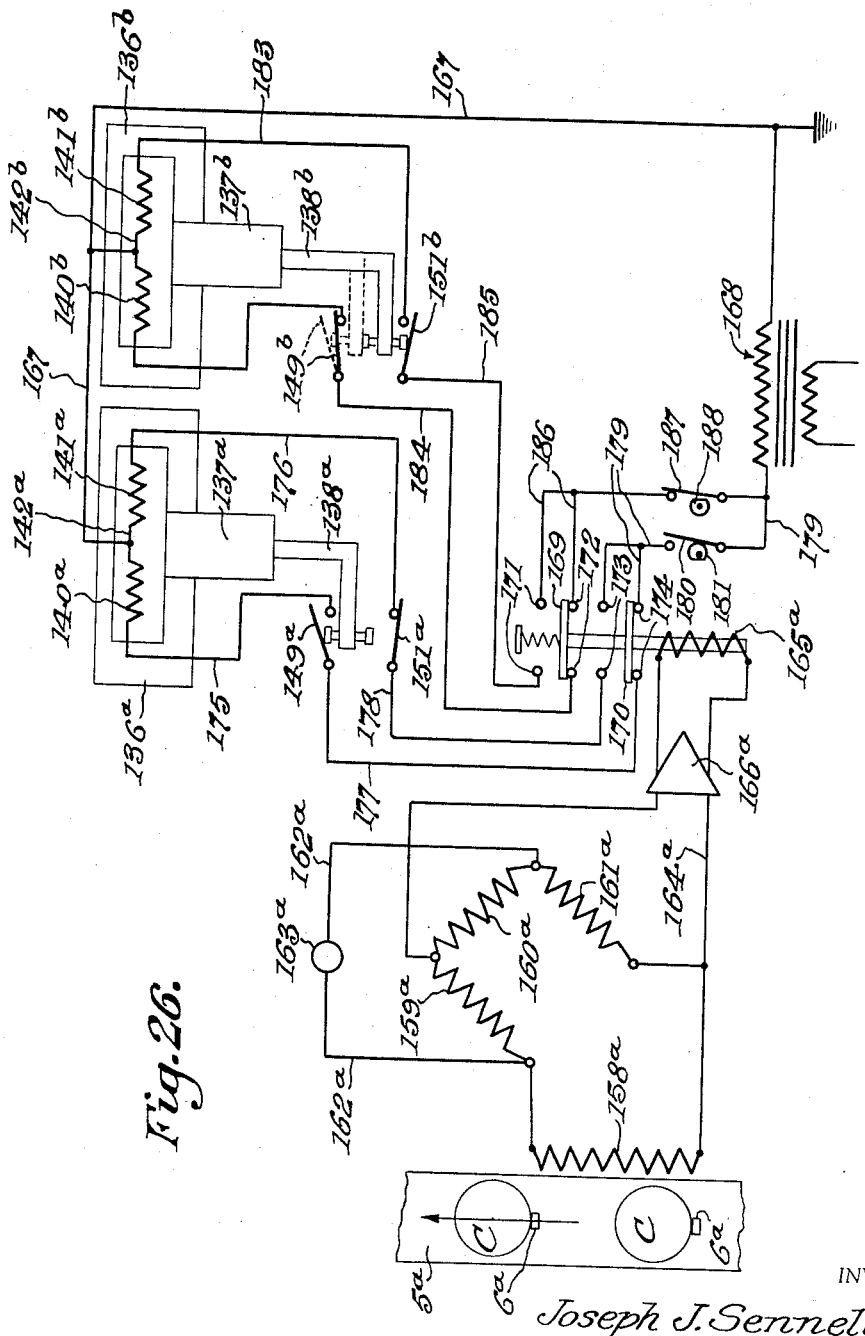

As shown on Figure 26, when the second can C enters the field of the bridge arm $158^a$ the relay switches 170, 169 remain closed, but the cam switch 180 will now be open, as shown, and at the same time the cam switch 187 will be closed by the control cam 188, because the rotary timing cams are 180° out of phase and each said cam rotates one half revolution for each can space travel. The cover feeding condition of the #1 cover feed unit $136^a$ remains unaffected, because the position of the relay is not changed and the timing cam switch 180 is open. At the same time the timing cam switch 187 is closed by its respective timing cam 188 and establishes a circuit through the switch $149^b$ for energizing the "feed on" solenoid $140^b$ of the #2 unit $136^b$ for shifting the air cylinder piston rod $138^b$ to its dotted line position and thereby opening the switch $149^b$ and closing switch $151^b$ to their dotted line positions in Figure 26. Thus, it will be seen that as long as cans continue to be fed uninterruptedly, the switches $149^a$ and $149^b$ remain open and cover feeding goes on in each of the #1 and #2 cover feed units. However, when there is a break in the procession of cans and there is a space on the feed chain $6^a$ relating to a given unit #1—$136^a$ or #2—$136^b$, then that unit will be controlled through its associated switch $151^a$ or $151^b$, depending on the cover feed unit affected, to cut off the cover feed when the preceding can moves out of the magnetic field of the bridge. In other words, when the relay is released by the absence of a can from its proper place in the feed line and a timing cam 181 or 188 closes its respective switch 180 or 187, the related cover feed unit $136^a$ or $136^b$ will have its supporting fingers projected for supporting the cover stack and preventing the feeding of covers by the continuously rotating feed screws.

The herein disclosed cover feeding apparatus and control arrangement provides marked advantages over prior known apparatus. Not only does the herein disclosed apparatus operate at much greater than previously attained speeds in the feeding of covers, but the feeding of the covers is carried out with great precision and accuracy. It has been noted also that operators feeding cover stacks to the herein disclosed apparatus are much less fatigued at the end of a working day than are operators feeding single stack apparatus operating at much lesser speeds. While greater effort must be expended in each double loading, or in other words the placement of two replenishing stacks at a time as compared to the single stack replacement, the operation of the feeder screws at the greatly reduced operating speeds described herein provides much longer rest intervals between stack replenishments, and this accounts for the great reduction in operator fatigue. Also the control devices disclosed herein are inherently much faster than any mechanical controls heretofore known, and there is no inertia of mechanical linkage devices by the cam which has to be overcome during operation of the devices. Another advantage of the disclosed electrical controls over mechanically operated devices is that there are no measurable forces exerted on the cans such as might mar delicate decorative coatings thereon.

Each set of cover feed screws operates at the same speed, namely one half revolution for each can space or turret pocket or arm travel, as before stated, whereas the feeder screws of the beforementioned Simpson Patent 2,579,976 made a full revolution for each can space travel. The rotary circuit timing or switch operating cams, phased 180° apart, rotate at the same speed as the feeder screws. The control cam associated with the #1 cover feeder unit is related so that it will permit its switch to close just as an alternate odd number can reaches the start of the control area provided by the bridge arm extending along the can feed line, and the control cam associated with the #2 cover feeder unit is related so that it will permit its switch to close just as an alternate even number can reaches the start of the control area.

Preferred arrangements and embodiments have been disclosed herein but it is to be understood, of course, that the structure and arrangement of parts may be varied without departing from the spirit and scope of the invention as defined in the appended claims.

I claim:

1. In apparatus of the character described, means for feeding metal cans in processional order and in equidistantly spaced relation, means for moving covers in like equidistantly spaced relation to be received on the cans at a make-up point, a cover feed means for depositing covers on said cover moving means, and means operable by mere passage of a can past a fixed control area for controlling the cover feed means to deposit the covers in position on the cover moving means so that each cover will be received on the can which controlled its deposition, said last named means including feed control devices and electrically operated control means therefor including switch means, and an inductance bridge circuit having one arm of the bridge arranged along the can feed line at the control area and in position for projecting an electro-magnetic field into the path of travel of the cans so that the inductance change created by the metal in each passing can will modify a predetermined normal control condition of the bridge circuit, and relay means controlled by such bridge circuit condition modification to control operation of the cover feed means through said switch means.

2. Apparatus as defined in claim 1 wherein there is included means for varying the effective length of the control area along the can feed line.

3. Apparatus as defined in claim 1 wherein there is included means for varying the effective length of the control area along the can feed line, said last named means comprising an adjustable amplifier connected in the inductance bridge circuit and an adjustable relay sensitivity means.

4. Apparatus as defined in claim 1 wherein there is included means for varying the position of the control area along the can feed line.

5. Apparatus as defined in claim 1 wherein there are included means for varying the effective length of the control area along the can feed line, and also means for varying the position of said control area along the can feed line.

6. Apparatus as defined in claim 1 wherein there are included means for varying the spacing of the said one arm of the inductance bridge laterally with respect to the can feed line and also longitudinally along said line, and also means for varying the effective length of said bridge arm.

7. Apparatus as defined in claim 1 wherein there is included a peripherally pocketed rotary closing turret whereon the cans are closed, wherein the cover moving means includes a peripherally pocketed rotary turret the pockets of which match up with the pockets of the closing turret at the can and cover make-up point, wherein the closing turret includes can closing devices for securing on the cans covers assembled thereon at the make-up point and vertically movable pads for lifting the cans and covers into the operating zone of said closing devices and for again lowering the closed cans, and wherein the can feeding means includes a straight line conveyor disposed to feed the cans in a straight line to the make-up point and which extends in the same straight line well beyond said make-up point.

8. In apparatus of the character described means for feeding metal cans in processional order and in equidistantly spaced relation, rotary turret means including a turret having spaced arms for moving covers in like equidistantly spaced relation to be received on the cans at a make-up point, a control area on the can feed line in advance of the make-up point, a #1 cover feeder unit and a #2 cover feeder unit over said cover moving arms for depositing covers in advance of the arms, said #1 unit and said control area being spaced like distances from the make-up point in the direction of movement of the cans and covers respectively and said #2 unit being placed two spaces beyond the #1 unit in the direction of cover movement, each said cover feeder unit including rotary screws effective to deliver a cover for each rotation thereof and the screws of the two sets of feeder unit screws being effective to receive and initiate the feeding of a cover simultaneously and to deliver a cover simultaneously, and each screw of the #2 unit including a 360° holding screw portion, means for rotating the screws of both units one half turn for each can and cover space travel, and control means actuated by passage of alternate cans past the control area for controlling operation of the #1 feeder unit and by such passage of the other alternate cans for controlling operation of the #2 feeder unit.

9. In apparatus of the character described, means for feeding metal cans in processional order and in equidistantly spaced relation, means for moving covers in like equidistantly spaced relation to be received on the cans at a make-up point, a #1 cover feeder unit and #2 cover feeder unit for depositing covers on said cover moving means, and means operable by mere passage of a can past a fixed control area for controlling the cover feeder units to cause them to deposit covers one at a time and alternately on the cover moving means so that each cover will be received on the can which controlled its deposition, said last named means including feed control means and electrically operated control means therefor including individual switch means associated with each of the feeder units, and an inductance bridge circuit having one arm of the bridge arranged along the can feed line at the control area and in position for projecting an inductance field into the path of travel of the cans so that the inductance change created by the metal in each passing can will modify a predetermined normal control condition of the bridge circuit, relay means controlled by passage of alternate cans through the control area to effectively actuate the switch means associated with one feeder unit and by passage of the other alternate cans through said control area for effectively actuating the switch means associated with the other feeder unit.

10. Apparatus as defined in claim 9 wherein each cover feeder unit associated switch means includes a switch closed by the bridge circuit relay each time a can passes the control area and a switch connected in series with the first mentioned switch and which is timed to close only with the passing of an individual alternation of cans, thereby to cause one feeder unit to be controlled by the passing of even alternate cans and the other unit to be controlled by the passing of odd alternate cans.

11. Apparatus as defined in claim 9 wherein there is included means for varying the effective length of the control area along the can feed line.

12. Apparatus as defined in claim 9 wherein there are included means for varying the effective length of the control area along the can feed line, and also means for varying the position of said control area along the can feed line, said last named means comprising an adjustable amplifier connected in the inductance bridge circuit.

13. Apparatus as defined in claim 9 wherein there are included means for varying the effective length of the control area along the can feed line, and also means for varying the position of said control area along the can feed line.

14. Apparatus as defined in claim 8 wherein the control means actuated by passage of the cans past the control area comprises feed control means and electrically operated control means therefor including individual switch means associated with each of the feeder units, and an inductance bridge circuit having one arm of the bridge arranged along the can feed line at the control area and in position for projecting an electro-magnetic field into the path of travel of the cans so that the inductance change created by the metal in each passing can will modify a predetermined normal control condition of the bridge circuit, relay means controlled by passage of alternate cans through the control area to effectively actuate the switch means associated with one feeder unit and by passage of the other alternate cans through said control area for effectively actuating the switch means associated with the other feeder unit.

15. Apparatus as defined in claim 8 wherein the control means actuated by passage of the cans past the control area comprises feed control means and electrically operated control means therefor including individual switch means associated with each of the feeder units, and an inductance bridge circuit having one arm of the bridge arranged along the can feed line at the control area and in position for projecting an electro-magnetic field into the path of travel of the cans so that the inductance change created by the metal in each passing can will modify a predetermined normal control condition of the bridge circuit, relay means controlled by passage of alternate cans through the control area to effectively actuate the switch means associated with one feeder unit and by passage of the other alternate cans through said control area for effectively actuating the switch means associated with the other feeder unit, and wherein each cover feeder unit associated switch means includes a switch closed by the bridge circuit relay each time a can passes the control area and a switch connected in series with the first mentioned switch and which is timed to close only with the passing of an individual alternation of cans, thereby to cause one feeder unit to be controlled by the passing of even alternate cans and the other feeder unit to be controlled by the passing of odd alternate cans.

16. Apparatus as defined in claim 8 wherein the control means actuated by passage of the cans past the control area comprises feed control means and electrically operated control means therefor including individual switch means associated with each of the feeder units, and an inductance bridge circuit having one arm of the bridge arranged along the can feed line at the control area and in position for projecting an electro-magnetic field into the path of travel of the cans so that the inductance change created by the metal in each passing can will modify a predetermined normal control condition of the bridge circuit, relay means controlled by passage of alternate cans through the control area to effectively actuate the switch means associated with one feeder unit and by passage of the other alternate cans through said control area for effectively actuating the switch means associated with the other feeder unit, and wherein each cover feeder unit associated switch means includes a switch closed by the bridge circuit relay each time a can passes the control area and a switch connected in series with the first mentioned switch and which is timed to close only with the passing of an individual alternation of cans, thereby to cause one feeder unit to be controlled by the passing of even alternate cans and the other feeder unit to be controlled by the passing of odd alternate cans, there also being included in the bridge circuit a variable amplifier.

17. Apparatus as defined in claim 8 wherein the control means actuated by passage of the cans past the control area comprises feed control means and electrically operated control means therefor including individual switch means associated with each of the feeder units, and an inductance bridge circuit having one arm of the bridge arranged along the can feed line at the control area and direction of the cover movement line and in position for dropping covers to be received and moved by the cover moving means parts, each said cover feeder unit including rotary screws effective to deliver a cover for each rotation thereof and the screws of the two sets of feeder unit screws being effective to receive and initiate the feeding of a cover simultaneously and to deliver a cover simultaneously and each screw of the #2 unit including a 360° holding screw portion, and there also being included means for rotating the screws of both units one half turn for each cover space travel.

18. In apparatus of the character described, cover moving means having thereon equidistantly spaced parts for receiving and moving covers in equidistantly spaced relation, a #1 cover feeder unit having a cover drop point disposed to drop covers individually and in position for being received and moved by the cover moving means parts, a #2 cover feeder unit having a cover drop point disposed two cover feed spaces beyond the #1 cover feed unit drop point in the direction of the cover movement line and in position for dropping covers to be received and moved by the cover moving means parts, each said cover feeder unit including grooved rotary screws for feeding the covers, there being included means for rotating the screws of both units in timed relation to the cover moving means and means on the #2 cover feeder unit screws for compensating for the spacing of the cover feeder units along the line of cover movement so that the cover feeder units will together deposit covers to be engaged by every cover moving part which passes the #2 cover feeder unit.

19. In apparatus of the character described, cover moving means having thereon equidistantly spaced parts for receiving and moving covers in equidistantly spaced relation, a #1 cover feeder unit having a cover drop point disposed to drop covers individually and in position for being received and moved by the cover moving means parts, a #2 cover feeder unit having a cover drop point disposed two cover feed spaces beyond the #1 cover feed unit drop point in the in position for projecting an inductance field into the path of travel of the cans so that the inductance change created by the metal in each passing can will modify a predetermined normal control condition of the bridge circuit, relay means controlled by passage of alternate cans through the control area to effectively actuate the switch means associated with one feeder unit and by passage of the other alternate cans through said control area for effectively actuating the switch means associated with the other feeder unit, and wherein each cover feeder unit associated switch means includes a switch closed by the bridge circuit relay each time a can passes the control area and a switch connected in series with the first mentioned switch and which is timed to close only with the passing of an individual alternation of cans, thereby to cause one feeder unit to be controlled by the passing of even alternate cans and the other feeder unti to be controlled by the passing of odd alternate cans, there also being included means for varying the effective length of the control area along the can feed line, and also means for varying the position of said control area along the can feed line.

20. In apparatus of the character described, means for feeding metal cans in processional order and in equidistantly spaced relation, means for moving covers in like equidistantly spaced relation to be received on the cans at a make-up point, two #1 and #2 cover feeder units and means for controlling operation of the feeder units to cause them to deposit covers one at a time and alternately to be received in alternation and in said equidistantly spaced relation upon the cover moving means, said cover feeding unit controlling means including devices controlled by mere presence of the metal cans moving toward the make-up point past, and without any physical contact at, a fixed control area, said last named devices being actuated by the passage of alternate cans to bring about the feeding of covers from one feeder unit and by the passage of the other alternate cans to bring about the feeding of covers from the other feeder unit.

21. In apparatus of the character described, means for feeding metal cans in processional order and in equidistantly spaced relation, means for moving covers in like equidistantly spaced relation to be received on the cans at a make-up point, two #1 and #2 cover feeder units and means for controlling operation of the feeder units to cause them to deposit covers one at a time and alternately to be received in alternation and in said equidistantly spaced relation upon the cover moving means, said #1 and #2 cover feeder units being spaced along the line of cover feed toward the make-up point, and said cover feeder unit controlling means including devices caused to function by the passage of alternate cans to bring about the feeding of covers from the #1 feeder unit and by the passage of the other alternate cans to bring about the feeding of covers by the #2 feeder unit.

22. In apparatus of the character described, means for feeding metal cans in processional order and in equidistantly spaced relation, means for moving covers in like equidistantly spaced relation to be received on the cans at a make-up point, two #1 and #2 cover feeder units and means for controlling operation of the feeder units to cause them to deposit covers one at a time and alternately to be received in alternation and in said equidistantly spaced relation upon the cover moving means, said #1 and #2 cover feeder units being spaced along the line of cover feed toward the make-up point, and said cover feeder unit controlling means including devices caused to function by the passage of alternate cans to bring about the feeding of covers from the #1 feeder unit and by the passage of the other alternate cans to bring about the feeding of covers by the #2 feeder unit, there being included in the #2 cover feeder unit means for retarding the actual deposition of each cover delivered thereby so that the #2 unit will feed covers in alternation to those delivered by the #1 unit and in proper timing to be received upon the alternate cans which controlled the feeding of the particular covers.

23. In apparatus of the character described, means for feeding metal cans in processional order and in equidistantly spaced relation, means for moving covers in like equidistantly spaced relation to be received on the cans at a make-up point, two #1 and #2 cover feeder units and means for controlling operation of the feeder units to cause them to deposit covers one at a time and alternately to be received in alternation and in said equidistantly spaced relation upon the cover moving means, said #1 and #2 cover feeder units being spaced along the line of cover feed toward the make-up point, and said cover feeder unit controlling means including devices caused to function by the passage of alternate cans to bring about the feeding of covers from the #1 feeder unit and by the passage of the other alternate cans to bring about the feeding of covers by the #2 feeder unit, each said cover feeder unit including grooved rotary screws for feeding the covers, the screws in the #2 cover feeder each having a holding screw groove portion in which to hold and retard the feeding of each cover in the process of being fed toward its point of deposition so that the #2 unit will feed covers in alternation to those delivered by the #1 unit and in proper timing to be received upon the alternate cans which controlled the feeding of the particular covers.

24. In apparatus of the character described, means for feeding metal cans in processional order and in equidistantly spaced relation, means for moving covers in like equidistantly spaced relation to be received on the cans at a make-up point, two #1 and #2 cover feeder units and means for controlling operation of the feeder units to cause them to deposit covers one at a time and alternately to be received in alternation and in said equidistantly spaced relation upon the cover moving means, said #1 and #2 cover feeder units being spaced along the line of cover feed toward the make-up point, and said cover feeder unit controlling means including devices caused to function by the passage of alternate cans to bring about the feeding of covers from the #1 feeder unit and by the passage of the other alternate cans to bring about the feeding of covers by the #2 feeder unit, each said cover feeder unit including grooved rotary screws for feeding the covers, the screws of both units being arranged to receive and initiate the feeding of a cover simultaneously and to deliver a cover simultaneously, and the screws in the #2 cover feeder each having a holding screw groove portion in which to hold and retard the feeding of each cover in the process of being fed toward its point of deposition so that the #2 unit will feed covers in alternation to those of the #1 unit and in proper timing to be received upon the alternate cans which controlled the feeding of the particular covers.

25. In apparatus of the character described, means for feeding metal cans in processional order and in equidistantly spaced relation, means for moving covers in like equidistantly spaced relation to be received on the cans at a make-up point, two #1 and #2 cover feeder units and means for controlling operation of the feeder units to cause them to deposit covers one at a time and alternately to be received in alternation and in said equidistantly spaced relation upon the cover moving means, said cover feeder unit controlling means including devices controlled by passage of the cans moving toward the make-up point and past a fixed control area, the cover moving means including a star wheel having feeder arms in advance of which the covers are deposited, the can feed spacing and the feeder arm spacing corresponding one to the other and the control area and the #1 cover feed drop point over the star wheel being placed a like number of spaces from the make-up point and the #2 cover feed drop point being placed two spaces beyond the #1 cover feed drop point in the direction of movement of the covers toward said make-up point, each said cover feeder unit including grooved rotary screws for feeding the covers, there being included means for rotating the screws of both units in timed relation to the can feed and star wheel arm movement and means on the

2 cover feed screws for compensating for the spacing of the #1 and #2 cover feed units along the line of cover feed so as to assure that each cover will be placed on the can which controlled its delivery.

References Cited in the file of this patent

UNITED STATES PATENTS

| | | |
|---|---|---|
| 1,953,769 | Rundell | May 15, 1934 |
| 2,114,297 | Grover | Apr. 19, 1938 |
| 2,516,278 | Vore | July 25, 1950 |
| 2,579,976 | Simpson | Dec. 25, 1951 |
| 2,734,674 | Ray | Feb. 14, 1956 |